US012772260B2

(12) United States Patent
Guo et al.

(10) Patent No.: US 12,772,260 B2
(45) Date of Patent: Oct. 20, 2026

(54) METHODS AND APPARATUS FOR IMPLEMENTING ENHANCED DYNAMIC ACKNOWLEDGMENT CODEBOOK FOR SIDELINK COMMUNICATION

(71) Applicant: QUALCOMM Incorporated, San Diego, CA (US)

(72) Inventors: Shaozhen Guo, Beijing (CN); Changlong Xu, Beijing (CN); Jing Sun, San Diego, CA (US); Xiaoxia Zhang, San Diego, CA (US); Siyi Chen, Beijing (CN); Luanxia Yang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 285 days.

(21) Appl. No.: 18/696,951

(22) PCT Filed: Dec. 1, 2021

(86) PCT No.: PCT/CN2021/134827
§ 371 (c)(1),
(2) Date: Mar. 28, 2024

(87) PCT Pub. No.: WO2023/097567
PCT Pub. Date: Jun. 8, 2023

(65) Prior Publication Data
US 2024/0414733 A1 Dec. 12, 2024

(51) Int. Cl.
*H04W 72/232* (2023.01)
*H04L 1/1867* (2023.01)
*H04W 72/40* (2023.01)

(52) U.S. Cl.
CPC ......... *H04W 72/232* (2023.01); *H04L 1/1887* (2013.01); *H04W 72/40* (2023.01)

(58) Field of Classification Search
CPC .... H04W 72/323; H04W 72/40; H04L 1/1887
See application file for complete search history.

(56) References Cited

U.S. PATENT DOCUMENTS

2020/0267597 A1 8/2020 Huang et al.
2021/0006318 A1* 1/2021 Kim ...................... H04L 1/1812
(Continued)

FOREIGN PATENT DOCUMENTS

CN 113544989 A 10/2021

OTHER PUBLICATIONS

International Search Report and Written Opinion—PCT/CN2021/134827—ISA/EPO—Jun. 30, 2022.

*Primary Examiner* — Brian J. Gillis
(74) *Attorney, Agent, or Firm* — ArentFox Schiff LLP

(57) ABSTRACT

Aspects of the present disclosure include methods, apparatuses, computer readable media, and/or means for receiving first DCI scheduling a transmission of first sidelink information, transmitting the first sidelink information via a first sidelink channel to a first receiving UE based on the first DCI, receiving first feedback information associated with the first sidelink information from the first receiving UE, receiving second DCI scheduling a transmission of second sidelink information, transmitting the second sidelink information via a second sidelink channel to the second receiving UE based on the second DCI, receiving second feedback information associated with the second sidelink information from the second receiving UE, generating HARQ information associated with at least one of the first feedback information or the second feedback information based on the first DCI and the second DCI, and transmitting the HARQ information.

30 Claims, 10 Drawing Sheets

(56) References Cited

U.S. PATENT DOCUMENTS

| | | | | |
|---|---|---|---|---|
| 2021/0050953 | A1* | 2/2021 | Park | H04L 1/1819 |
| 2021/0075556 | A1 | 3/2021 | Karaki et al. | |
| 2021/0250136 | A1* | 8/2021 | Ye | H04L 1/1861 |
| 2022/0140958 | A1* | 5/2022 | Zhou | H04W 72/20<br>370/329 |

* cited by examiner

METHODS AND APPARATUS FOR IMPLEMENTING ENHANCED DYNAMIC ACKNOWLEDGMENT CODEBOOK FOR SIDELINK COMMUNICATION

CROSS-REFERENCE TO RELATED APPLICATIONS

This application is a 35 U.S.C. § 371 National Phase Application of PCT Application No. PCT/CN2021/134827 filed Dec. 1, 2021, entitled “METHODS AND APPARATUS FOR IMPLEMENTING ENHANCED DYNAMIC ACKNOWLEDGMENT CODEBOOK FOR SIDELINK COMMUNICATION,” the contents of which are hereby incorporated by reference in their entireties.

BACKGROUND

Aspects of the present disclosure relate generally to wireless communications, and more particularly, to apparatuses and methods for implementing enhanced dynamic acknowledgment codebook for sidelink communication.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

In a wireless communication network, a base station (BS) may allocate sidelink (SL) resources to a transmitting user equipment (UE) for transmitting SL information to a receiving UE. In order to notify the BS of the successful or failed transmission, the transmitting UE may send control information indicating whether the receiving UE successfully received the SL information. If the transmission failed, the BS may allocate additional resources for retransmission. However, the transmitting UE may fail to properly transmit the control information to the BS. Therefore, improvements may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods by a receiving user equipment (UE) for receiving first DCI scheduling a transmission of first sidelink information, transmitting the first sidelink information via a first sidelink channel to a first receiving UE based on the first DCI, receiving first feedback information associated with the first sidelink information from the first receiving UE, receiving second DCI scheduling a transmission of second sidelink information, transmitting the second sidelink information via a second sidelink channel to the second receiving UE based on the second DCI, receiving second feedback information associated with the second sidelink information from the second receiving UE, generating HARQ information associated with at least one of the first feedback information or the second feedback information based on the first DCI and the second DCI, and transmitting the HARQ information.

Other aspects of the present disclosure include a receiving user equipment (UE) having a memory comprising instructions, a transceiver, and one or more processors operatively coupled with the memory and the transceiver, the one or more processors configured to execute instructions in the memory to receive first DCI scheduling a transmission of first sidelink information, transmit the first sidelink information via a first sidelink channel to a first receiving UE based on the first DCI, receive first feedback information associated with the first sidelink information from the first receiving UE, receive second DCI scheduling a transmission of second sidelink information, transmit the second sidelink information via a second sidelink channel to the second receiving UE based on the second DCI, receive second feedback information associated with the second sidelink information from the second receiving UE, generate HARQ information associated with at least one of the first feedback information or the second feedback information based on the first DCI and the second DCI, and transmit the HARQ information.

An aspect of the present disclosure includes a receiving user equipment (UE) including means for receiving first DCI scheduling a transmission of first sidelink information, transmitting the first sidelink information via a first sidelink channel to a first receiving UE based on the first DCI, receiving first feedback information associated with the first sidelink information from the first receiving UE, receiving second DCI scheduling a transmission of second sidelink information, transmitting the second sidelink information via a second sidelink channel to the second receiving UE based on the second DCI, receiving second feedback information associated with the second sidelink information from the second receiving UE, generating HARQ information associated with at least one of the first feedback information or the second feedback information based on the first DCI and the second DCI, and transmitting the HARQ information.

Some aspects of the present disclosure include non-transitory computer readable media having instructions stored therein that, when executed by one or more processors of a receiving user equipment (UE), cause the one or more processors to receive first DCI scheduling a transmission of first sidelink information, transmit the first sidelink information via a first sidelink channel to a first receiving UE based on the first DCI, receive first feedback information associated with the first sidelink information from the first receiving UE, receive second DCI scheduling a transmission of second sidelink information, transmit the second sidelink information via a second sidelink channel to the second receiving UE based on the second DCI, receive second feedback information associated with the second sidelink information from the second receiving UE, generate HARQ information associated with at least one of the first feedback information or the second feedback information based on the first DCI and the second DCI, and transmit the HARQ information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
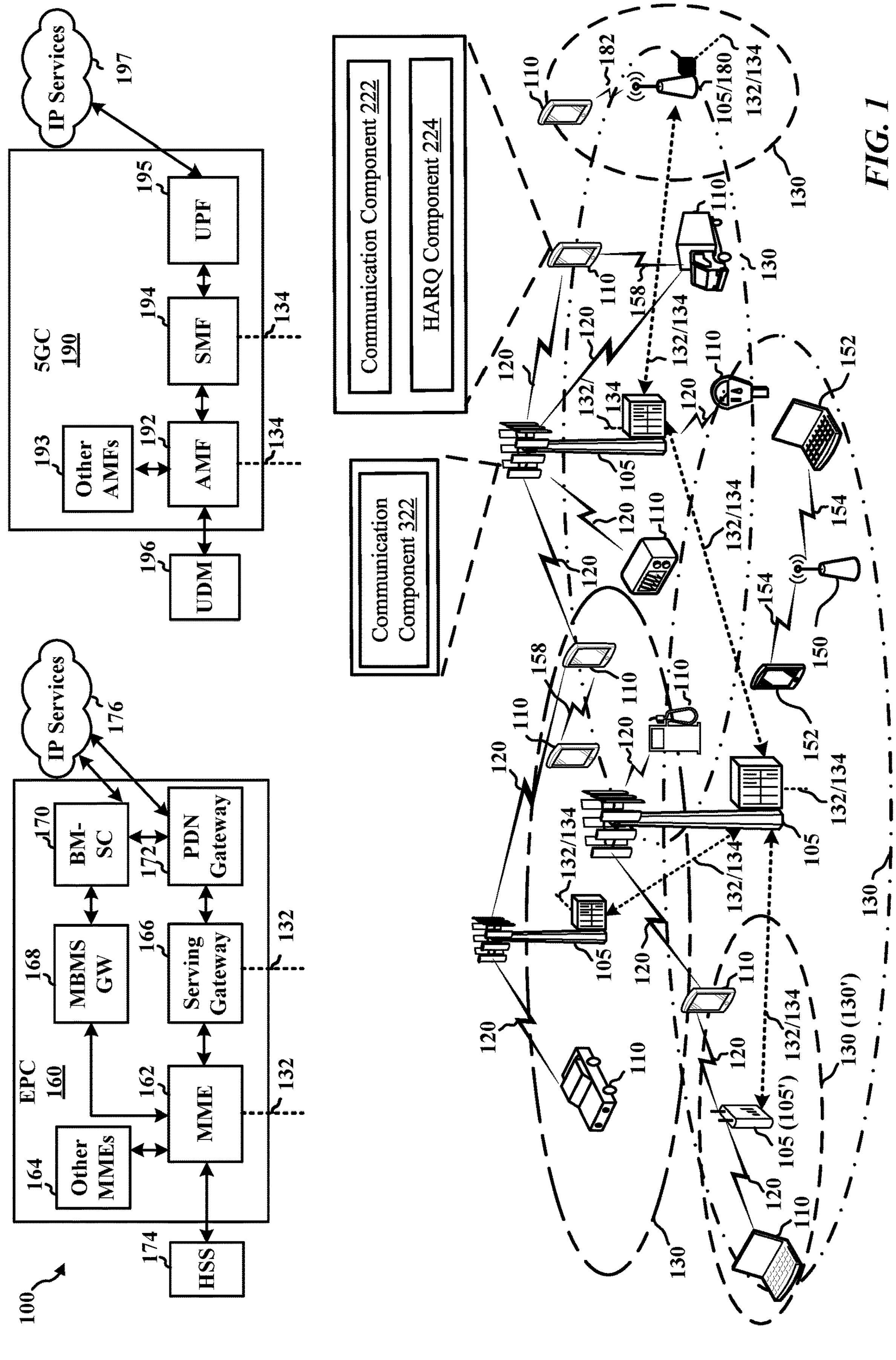
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In some aspects, a dynamic codebook may be enhanced to support retransmission of hybrid automatic repeat request (HARQ) acknowledgement (ACK) previously transmitted or failed to transmit due to listen-before-talk (LBT) failures. For example, the enhanced dynamic codebook may be useful in vehicle to other device (V2X) communications, also referred to as sidelink (SL) communications, such as but not limited to SL mode 1 communications, and including new radio unlicensed (NR-U) communications. HARQ ACK retransmission triggering may be implemented in the unit of physical downlink shared channel (PDSCH) groups, where two groups are implemented when enhanced dynamic codebook is configured. An explicit group index may be included in downlink control information (DCI) scheduling the PDSCH. A new ACK-feedback group indication (NFI) may also be included in the DCI for each PDSCH group. Each NFI operates as a toggle bit, for example, similar to new data indicator (NDI). The size of a group may increase when more PDSCH of the same group are granted, until NFI for the group “flips” (toggling from one value to another). The group size may increase after the ACK is transmitted. One or more of a total downlink assignment index (T-DAI) and/or a counter downlink assignment index (C-DAI) may be counted per group and may count until the NFI flips.

An aspect, under the enhanced dynamic codebook in DCI 1_1, may include adding one bit for HARQ ACK triggering, where a value of “0” means only reporting HARQ-ACK for the scheduled group, and a value of “1” means reporting HARQ-ACK for both groups, i.e., scheduled group and non-scheduled group. When both PDSCH groups are triggered, the placement of HARQ ACK feedback for the two groups may be ordered based on increasing group index. For the scheduled group, T-DAI/C-DAI may be included in DCI 1_1 as in a legacy system and the NFI (e.g., 1 bit) may be included. The C-DAI and/or the T-DAI may be accumulated within a PDSCH group until the NFI for the PDSCH group is toggled. The C-DAI and T-DAI may reset when the NFI is toggled. The C-DAI and/or the T-DAI may not reset by PUCCH transmission occasions.

In some aspects, the base station (BS) may configure the user equipment (UE) using radio resource control (RRC) if the NFI and the T-DAI (e.g., 2 bits) for the non-scheduled group are included. The presence of the NFI and the T-DAI for non-scheduled group can be used to protect against errors but at the cost of increased DCI size. If the enhanced dynamic codebook is configured, for DCI 0_1, the presence of uplink (UL) DAI for an additional PDSCH group in the non-fallback DCI may be configured by RRC signaling. If the UL DAI is configured to be present in the non-fallback DCI for two groups, the UL DAI fields may apply separately to each group. If the UL DAI is configured to be present in the non-fallback DCI for only one group, then the enhanced dynamic HARQ ACK codebook feedback in physical uplink shared channel (PUSCH) may be implemented as follows. If the feedback is requested for one group, then the UL DAI applies to the reported group. If the feedback is requested for both groups, then the UL DAI applies to group #0 and the UE derives the DAI for group #1 by the latest DCI scheduling PDSCH reception for group #1 for the HARQ feedback occasion.

In certain aspects, for sidelink (SL) communication, the transmitting (TX) UE may send the acknowledgement/not acknowledgement (A/N) for SL transmission to the BS. The BS may send DCI 3_0 to schedule a SL transmission and indicate the A/N reporting timing and PUCCH resource indicator (PRI). The A/N may depend on physical sidelink feedback channel (PSFCH) that the SL TX UE received from the receiving (RX) UE. The BS may configure Type-1 SL configured grant (CG), and the RRC parameter sl-ACKToUL-ACK may indicate the A/N timing. The BS may configure Type-2 SL CG, and the activation of DCI 30 may provide A/N reporting timing and PRI. The A/N may be multiplexed into a codebook and reported on PUCCH or PUSCH. In some instances, an enhanced dynamic HARQ ACK codebook may be supported to allow retransmission of HARQ-ACK previously transmitted or failed to transmit due to LBT failure.

For SL HARQ-ACK reporting to the BS, an aspect of the present disclosure may include supporting enhanced Type-2 HARQ ACK codebook to allow retransmission of HARQ ACK previously transmitted or fail to transmit due to LBT failure. Enhanced Type-2 HARQ ACK codebook for SL may be separately configured from enhanced Type-2 HARQ ACK codebook for DL. For sidelink HARQ-ACK reporting to the BS, some aspects of the present disclosure may include supporting a single group physical sidelink shared channel (PSSCH) when enhanced dynamic HARQ ACK codebook is configured.

An aspect of the present disclosure includes introducing a new sidelink ACK-feedback group indicator (NSFI) in DCI format 3_0. A total sidelink assignment index (T-SAI) field in DCI format 3_0 may also be supported, e.g., for SL carrier aggregation (CA). The size of the PSSCH group may increase when more PSSCHs are granted, until NSFI “flips” (toggling from one value to another). The group size may increase before or after the ACK is transmitted. The counter sidelink assignment index (C-SAI) may reset when the NSFI is toggled. C-SAI and T-SAI may or may not be reset by PUCCH transmission occasions.

An aspect of the present disclosure includes a PSSCH group concept where SL HARQ ACK retransmission triggering is in the unit of PSSCH groups. For sidelink HARQ-ACK reporting to the BS, an aspect includes supporting two groups when enhanced dynamic codebook is configured for sidelink. An explicit group index may be included in DCI format 3_0 scheduling the PSSCH. Another aspect includes a NSFI for each PSSCH group in DCI format 3_0. The NSFI may operate as a toggle bit. For non-scheduled group, the NSFI field may be configurable by RRC. The size of a group may increase when more PSSCHs of the same group are granted, and/or until the NSFI for the group flips. The group size may increase before or after the ACK is transmitted. The T-SAI and/or the C-SAI may be counted per group and may count until the NSFI flips.

In one example, in DCI 3_0, an aspect of the present disclosure may include adding one bit for HARQ ACK triggering, with “0” means only reporting HARQ-ACK information for the scheduled group and “1” means reporting HARQ-ACK information for both groups. When both PSSCH groups are triggered, the placement of HARQ ACK feedback for the two groups may be ordered based on increasing group index. For the scheduled group, one or more of the following fields may be included in DCI format 3_0: C-SAI (e.g., 2 bits), T-SAI (e.g., 2 bits) in case SL CA is supported, and/or NSFI (e.g., 1 bit). In some aspects, the C-SAI and/or the T-SAI may be accumulated within a PSSCH group until NSFI for the PSSCH group is toggled. The C-SAI and/or the T-SAI may be reset when the NSFI is toggled. The C-SAI and/or the T-SAI may not be reset by PUCCH transmission occasions. For the non-scheduled group, one or more of the following fields may be included in DCI format 3_0: NSFI (e.g., 1 bit) and/or T-SAI field (e.g., 2 bits). Whether the NSFI field and/or the T-SAI field is included may be configured by RRC.

In some aspects of the present disclosure, if the enhanced dynamic HARQ ACK codebook is configured for SL and two groups are supported, the presence of UL SAI for an additional PSSCH group in the non-fallback DCI (i.e., DCI format 0_1) may be configured by RRC. If the UL SAI is configured to be present in the non-fallback DCI (i.e., DCI format 0_1) for two groups, the UL SAI fields may apply separately to each group. For example, the most significant bits (MSBs) of the UL SAI field in the DCI format 0_1 may be used for group #0, and the least significant bits (LSBs) of the UL SAI field in the DCI format 0_1 may be used for group #1. If the UL SAI is configured to be present in the non-fallback DCI (i.e., DCI format 0_1) for only one group, then for enhanced dynamic HARQ-ACK codebook in PUSCH, the following may be implemented. If feedback is requested for just one group, then the UL SAI may apply to the reported group. If feedback is requested for both groups, then the UL SAI may apply to group #0 and the UE may derive the SAI for group #1 by the latest DCI (i.e., DCI format 3_0) scheduling PSSCH transmission for group #1 for this HARQ feedback occasion.

FIG. 1 is a diagram illustrating an example of a wireless communications system and an access network 100. The wireless communications system (also referred to as a wireless wide area network (WWAN)) includes at least one BS 105, UEs 110, an Evolved Packet Core (EPC) 160, and a 5G Core (5GC) 190. The BS 105 may include macro cells (high power cellular base station) and/or small cells (low power cellular base station). The macro cells include base stations. The small cells include femtocells, picocells, and microcells.

In one implementation, the UE 110 may include a communication component 222 configured to communicate with the BS 105 via a cellular network, a Wi-Fi network, or other wireless and wired networks. In some aspects, the communication component 222 may be configured to transmit and/or receive sidelink (SL) information and/or control information, including using an enhanced dynamic codebook as described herein. The UE 110 may include a HARQ component 224 configured to generate HARQ information as described herein. In some implementations, the communication component 222 and/or the HARQ component 224 may be implemented using hardware, software, or a combination of hardware and software. In some implementations, the BS 105 may include a communication component 322 configured to communicate with the UE 110, such as for configuring the enhanced dynamic codebook for SL communications and/or receiving SL information and/or control information based on the enhanced dynamic codebook as described herein. In some implementations, communication component 322 may be implemented using hardware, software, or a combination of hardware and software.

A BS 105 configured for 4G Long-Term Evolution (LTE) (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A BS 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the BS 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BS 105 may communicate directly or indirectly (e.g., through the EPC 160 or 5GC 190) with each other over the backhaul links interfaces 134. The backhaul links 132, 134 may be wired or wireless.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The BS 105/UEs 110 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A BS 105, whether a small cell 105' or a large cell (e.g., macro base station), may include an eNB, gNodeB (gNB), or other type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, aNodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
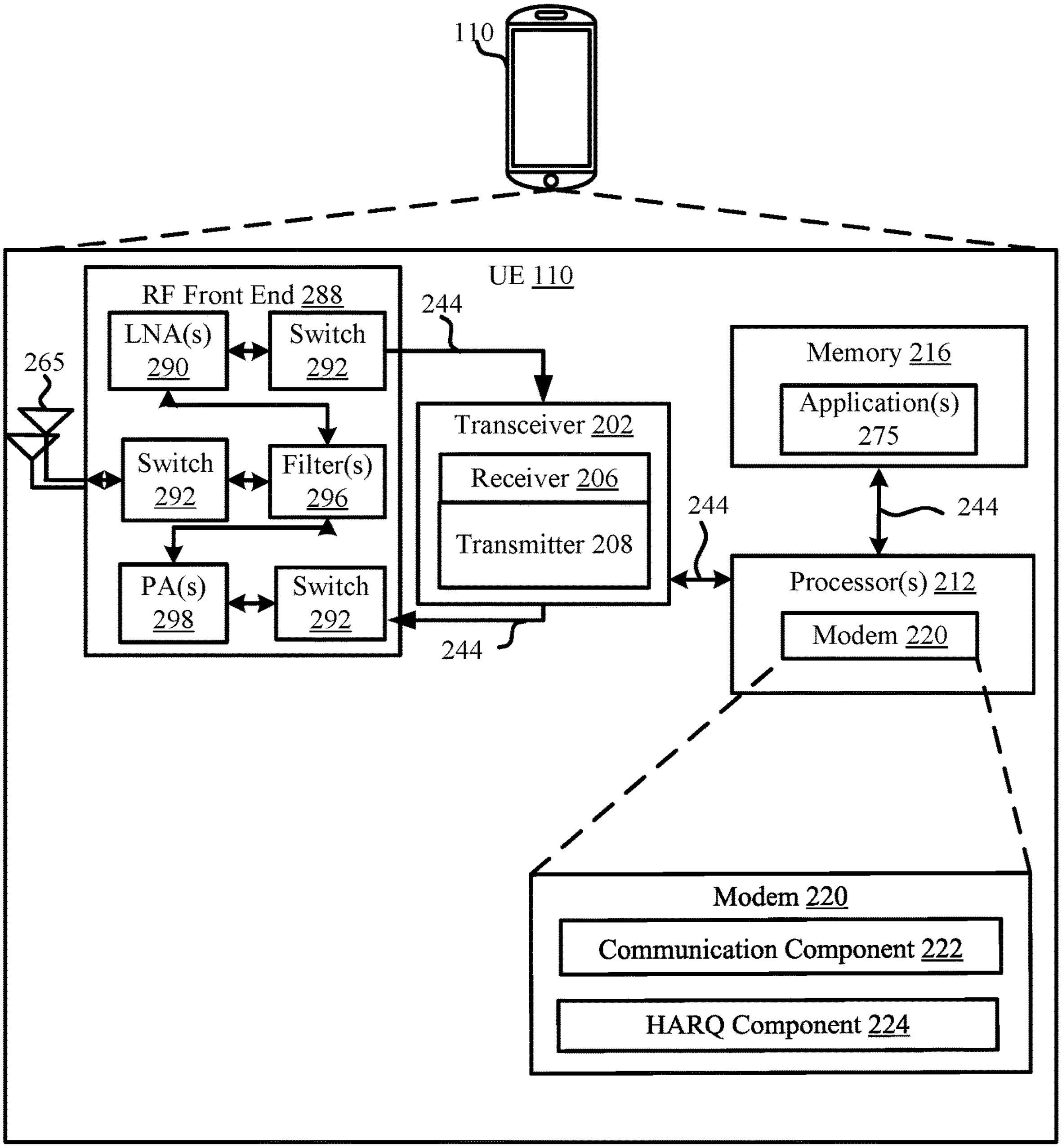
FIG. 2 is a schematic diagram of an example of a user equipment.

Referring to FIG. 2, one example of an implementation of the UE 110 may include a modem 220 having the communication component 222 and/or the HARQ component 224. In one implementation, the UE 110 may include a communication component 222 configured to communicate with the BS 105 via a cellular network, a Wi-Fi network, or other wireless and wired networks. The UE 110 may include a HARQ component 224 configured to generate HARQ information.

In some implementations, the UE 110 may include a variety of components, including components such as one or more processors 212 and memory 216 and transceiver 202 in communication via one or more buses 244, which may operate in conjunction with the modem 220 and the communication component 222 to enable one or more of the functions described herein related to communicating with the BS 105. Further, the one or more processors 212, modem 220, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 220 that uses one or more modem processors. The various functions related to the communication component 222 and/or the HARQ component 224 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 220 may configure the UE 110 along with the processors 212. In other aspects, some of the features of the one or more processors 212 and/or the modem 220 associated with the communication component 222 may be performed by transceiver 202.

The memory 216 may be configured to store data used and/or local versions of application 275. Also, the memory 216 may be configured to store data used herein and/or local versions of the communication component 222, the HARQ component 224 and/or one or more of the subcomponents being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 222, the HARQ component 224, and/or one or more of the subcomponents, and/or data associated therewith, when UE 110 is operating at least one processor 212 to execute the communication component 222, the HARQ component 224, and/or one or more of the subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a RF receiving device. In an aspect, the receiver 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
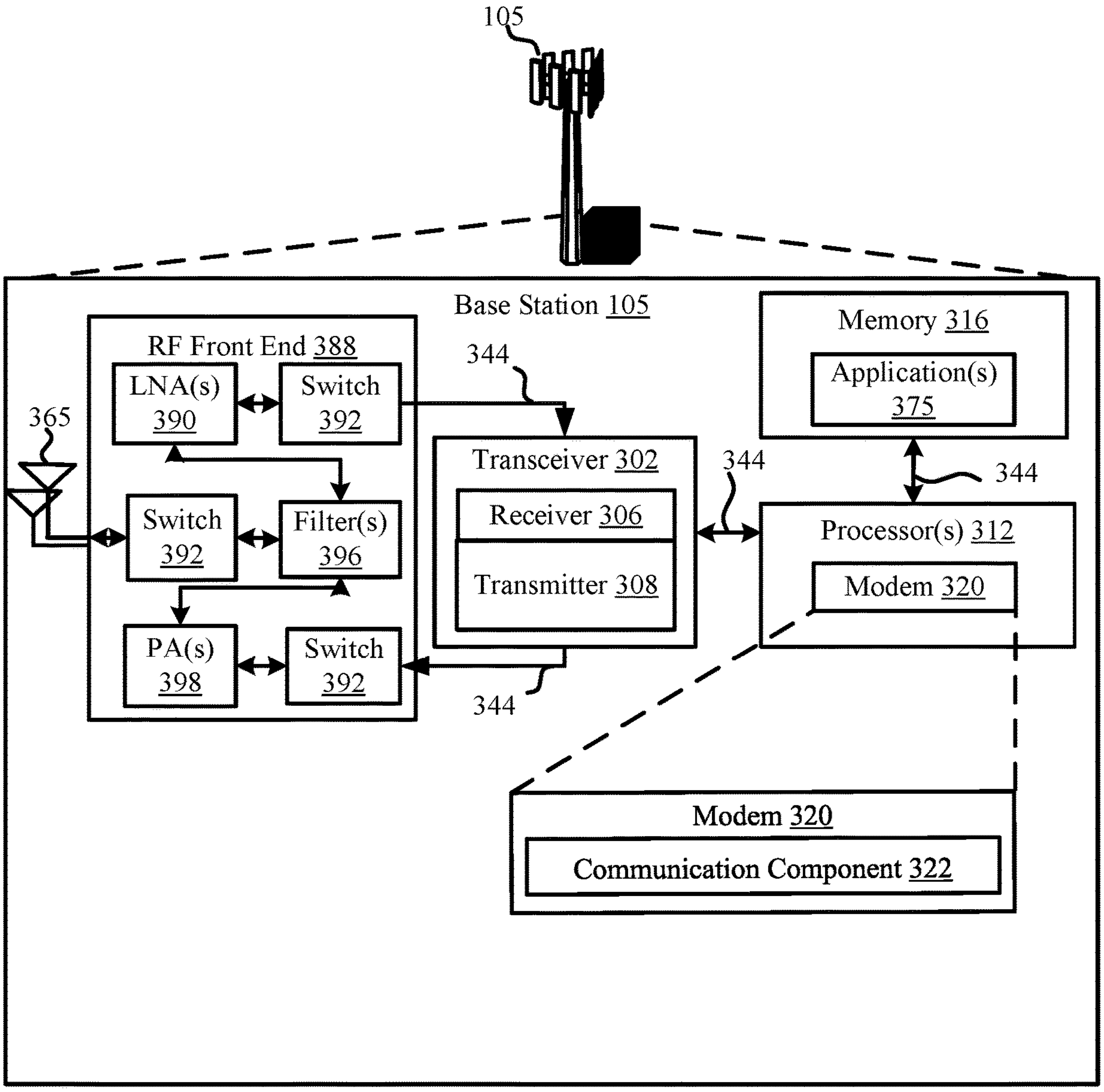
FIG. 3 is a schematic diagram of an example of a base station.

Referring to FIG. 3, one example of an implementation of the BS 105 may include a modem 320 having communication component 322. In some implementations, the BS 105 may include a communication component 322 configured to communicate with the UE 110.

In some implementations, the BS 105 may include a variety of components, including components such as one or more processors 312 and memory 316 and transceiver 302 in communication via one or more buses 344, which may operate in conjunction with the modem 320 and the communication component 322 to enable one or more of the functions described herein related to communicating with the UE 110. Further, the one or more processors 312, modem 320, memory 316, transceiver 302, RF front end 388 and one or more antennas 365, may be configured to support voice and/or data calls (simultaneously or non-simultaneously) in one or more radio access technologies.

In an aspect, the one or more processors 312 may include the modem 320 that uses one or more modem processors. The various functions related to communication component 322 may be included in the modem 320 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with transceiver 302. Additionally, the modem 320 may configure the BS 105 and processors 312. In other aspects, some of the features of the one or more processors 312 and/or the modem 320 associated with the communication component 322 may be performed by transceiver 302.

The memory 316 may be configured to store data used herein and/or local versions of applications 375. Also, the memory 316 may be configured to store data used herein and/or local versions of communication component 322, and/or one or more of the subcomponents being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining communication component 322, and/or one or more of the subcomponents, and/or data associated therewith, when the BS 105 is operating at least one processor 312 to execute communication component 322, and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, a RF receiving device. In an aspect, receiver 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 320 may configure transceiver 302 to operate at a specified frequency and power level based on the base station configuration of the BS 105 and the communication protocol used by the modem 320.

In an aspect, the modem 320 may be a multiband-multimode modem, which may process digital data and communicate with transceiver 302 such that the digital data is sent and received using transceiver 302. In an aspect, the modem 320 may be multiband and be configured to support multiple frequency bands for a specific communications protocol. In an aspect, the modem 320 may be multimode and be configured to support multiple operating networks and communications protocols. In an aspect, the modem 320 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
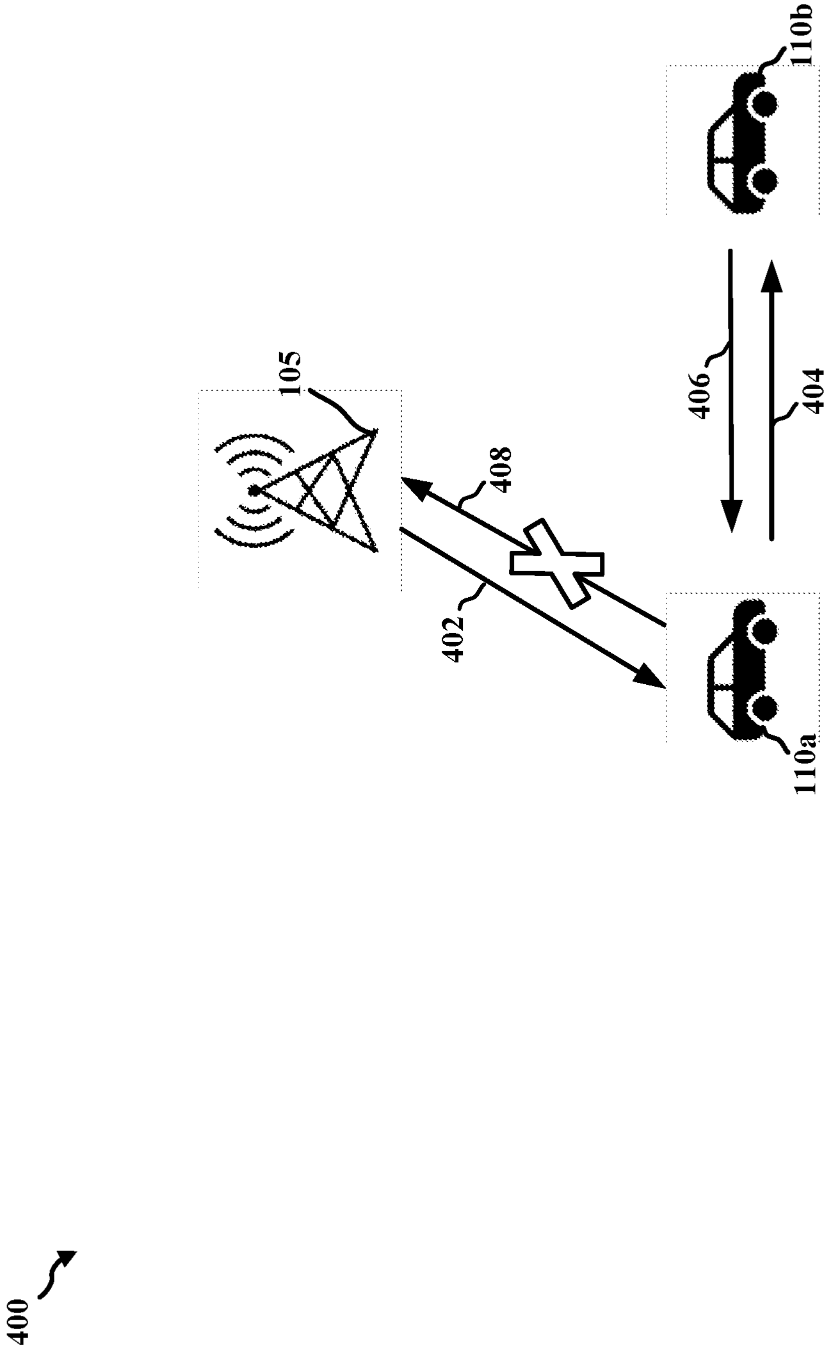
FIG. 4 illustrates an example of an environment for transmission of sidelink acknowledgements according to aspects of the present disclosure.

FIG. 4 illustrates an example of an environment for transmission of sidelink acknowledgements. In some aspects, an environment 400 may include a BS 105 (e.g., such as a gNB or an eNB). The environment 400 may include a TX UE 110*a* and a RX UE 110*b*. The TX UE 110*a* may receive a resource grant 402 (e.g., DCI) from the BS 105 for transmitting SL information 404 to the RX UE 110*b*. Based on the resources indicated in the resource grant 402, the TX UE 110*a* may transmit SL information 404 to the RX UE 110*b* via one or more SL communication channels (e.g., PSSCH). In response to the SL information 404, the RX UE 110*b* may transmit SL feedback information 406 indicating whether the RX UE 110*b* has successfully received and/or decoded the SL information 404. The RX UE 110*b* may transmit the SL feedback information 406 via one or more SL feedback channels (e.g., PSFCH). The SL feedback information 406 may indicate ACK or negative acknowledgement (NACK) corresponding to the SL information 404. After receiving the SL feedback information 406 from the RX UE 110*b*, the TX UE 110*a* may attempt to transmit SL HARQ ACK 408 (including some or all of the SL feedback information 406) to the BS 105. In certain aspects, the TX UE 110*a* may transmit the SL HARQ ACK 408 to the BS 105. In some instances, the TX UE 110*a* may fail to transmit the SL HARQ ACK 408 due to failed LBT transmission, radio failures, and/or other reasons.

In some aspects of the present disclosure, the TX UE 110*a* may wait for a subsequent SL HARQ ACK transmission to retransmit the SL HARQ ACK 408 (previously transmitted) or transmit the SL HARQ ACK 408 (previously failed to transmit) to the BS 105. The subsequent SL HARQ ACK transmission may be associated with SL information transmitted to the RX UE 110*b*, or a different UE (not shown). For SL HARQ-ACK reporting to the BS 105, an aspect of the present disclosure may include supporting enhanced Type-2 HARQ ACK codebook to allow retransmission of HARQ ACK previously transmitted or fail to transmit due to LBT failure. Enhanced Type-2 HARQ ACK codebook for SL may be separately configured from enhanced Type-2 HARQ ACK codebook for DL. For SL HARQ-ACK reporting to the BS, some aspects of the present disclosure may include supporting a single group physical SL shared channel (PSSCH) when enhanced dynamic HARQ ACK codebook is configured.

An aspect of the present disclosure includes introducing anew SL ACK-feedback group indicator (NSFI) in DCI format 3_0. A total SL assignment index (T-SAI) field in DCI format 3_0 for SL carrier aggregation (CA) may be supported. The size of the PSSCH group may increase when more PSSCHs are granted, until NSFI "flips" (toggling from one value to another). The group size may increase before or after the SL accumulation index (C-SAI) may resent when the NSFI is toggled. C-SAI and T-SAI may not be reset by PUCCH transmission occasions.

Figure 5:
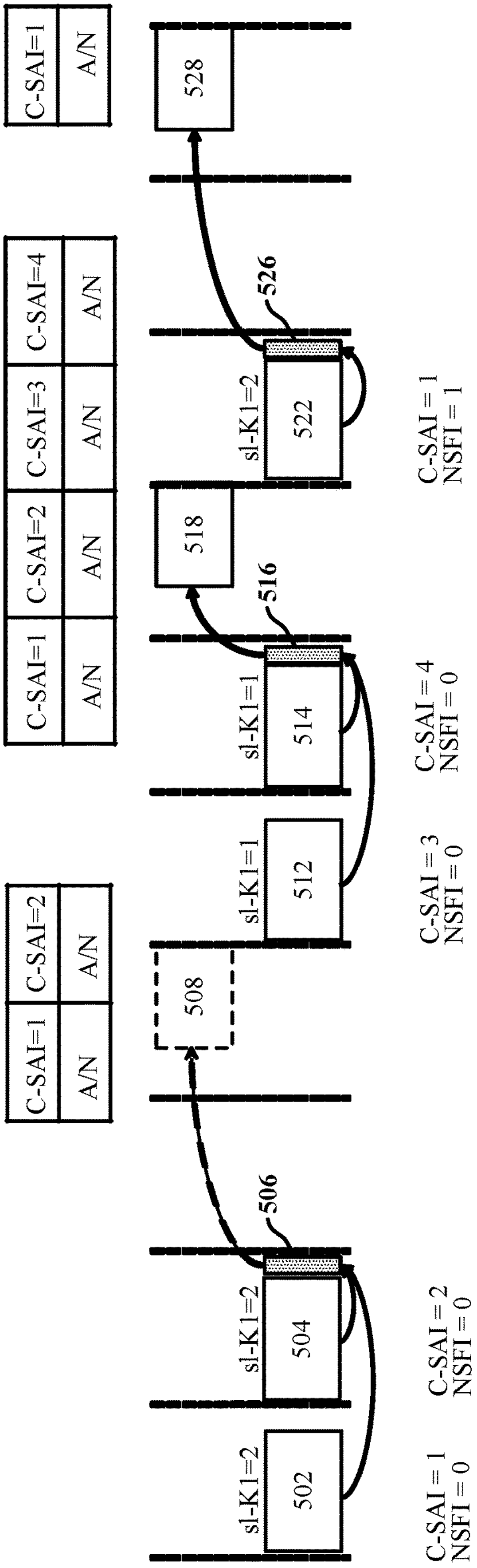
FIG. 5 illustrates an example of a timing diagram showing transmission of sidelink acknowledgements according to aspects of the present disclosure.

FIG. 5 illustrates an example of a timing diagram showing transmission of sidelink acknowledgements. In some aspects, additionally referencing FIG. 4, the TX UE 110*a* may transmit first SL information 502 and second SL information 504 to the RX UE 110*b*. The RX UE 110*b* may transmit first feedback information 506 to the TX UE 110*a* indicating the successful or failed reception and/or decoding of the first SL information 502 and/or the second SL information 504.

In some aspects, the TX UE 110*a* may report first HARQ information 508 associated with the first feedback information 506. The TX UE 110*a* may successfully transmit or fail to transmit the first HARQ information 508 (as indicated by the dashed lines). The slot location of the resources for transmitting the first HARQ information 508 may be determined based on the PSFCH-to-HARQ_feedback timing indicator field value (i.e., sl-K1 in the figure) in the DCIs scheduling the SL information 502 and 504 wherein the PSFCH-to-HARQ_feedback indicator indicates an offset value from the slot of PSFCH which carries the first feedback information 506 to the slot of PUCCH which carries the first HARQ-ACK information 508. For example, the first SL information 502 may be indicated with an offset value (sl-K1) of 2 indicating the corresponding HARQ ACK/NACK is to be transmitted 2 slots after the slot of the first feedback information 506. The second SL information 504 may be indicated with an offset value of 2 indicating the corresponding HARQ ACK/NACK is to be transmitted 2 slots after the slot of the first feedback information 506. The DCI scheduling the first SL information 502 may include a C-SAI value of 1 indicating the first position in the current group. The DCI scheduling the second SL information 504 may include a C-SAI value of 2 indicating the second position in the current group. The latest NSFI received by the TX UE 110*a* (e.g., received in the DCI for scheduling the second SL information 504) may remain unchanged (e.g., value of 0) from a previous NSFI.

In some aspects, the TX UE 110*a* may transmit third SL information 512 and fourth SL information 514 to the RX UE 110*b*. The RX UE 110*b* may transmit second feedback information 516 to the TX UE 110*a* indicating the successful or failed reception and/or decoding of the third SL information 512 and/or the fourth SL information 514. The TX UE 110*a* may report second HARQ information 518 (discussed below). The slot location of the resources for transmitting the second HARQ information 518 may be determined based on the PSFCH-to-HARQ_feedback timing indicator field value (i.e., sl-K1 in the figure) in the DCIs scheduling the SL information 512 and 514 wherein the PSFCH-to-HARQ_feedback indicator indicates an offset value from the slot of PSFCH which carries the second feedback information 516 to the slot of PUCCH which carries the second HARQ-ACK information 518. For example, the third SL information 512 may be associated with an offset value of 1 indicating the corresponding HARQ ACK/NACK is to be transmitted 1 slots after the slot of the second feedback information 516. The fourth SL information 514 may be associated with an offset value of 1 indicating the corresponding HARQ ACK/NACK is to be transmitted 1 slot after the slot of the second feedback information 516. The DCI for scheduling the third SL information 512 may include a C-SAI value of 3 indicating the third position in the current group. The DCI for scheduling the fourth SL information 514 may include a C-SAI value of 4 indicating the fourth position in the current group. The latest NSFI received by the TX UE 110*a* (e.g., received in DCI for scheduling the fourth SL information 514) may remain unchanged (e.g., value of 0) from a previous NSFI.

In an aspect of the present disclosure, the second HARQ information 518 may include the HARQ-ACK information corresponding to the first SL information 502, the second SL information 504, the third SL information 512, and the fourth SL information 514. The HARQ-ACK information corresponding to the the first SL information 502 and the second SL information 504 may be transmitted to the BS 105 for the first time (if the TX UE 110*a* failed to transmit the first HARQ information 508 previously) or retransmitted to the BS 105 (if the TX UE 110*a* successfully transmitted the first HARQ information 508 previously).

In some aspects of the current disclosure, the TX UE 110*a* may transmit fifth SL information 522 to the RX UE 110*b*. The latest NSFI received by the TX UE 110*a* (e.g., received in DCI for scheduling the fifth SL information 522) may "flip" (toggling to the value of 1). As a result, the C-SAI value of the fifth SL information 522 may reset to 1 (from the value of 4). The RX UE 110*b* may transmit third feedback information 526 to the TX UE 110*a* indicating the successful or failed reception and/or decoding of the fifth SL information 522. The TX UE 110*a* may report third HARQ information 528. Due to the NSFI "flip," the third HARQ information 528 may include HARQ ACK/NACK corresponding to only the fifth SL information 522. The location of the resources for transmitting the third feedback information 526 may be determined based on the PSFCH-to-HARQ_feedback timing indicator field value (i.e., sl-K1 in the figure) in the DCI scheduling the SL information 522 wherein the PSFCH-to-HARQ_feedback indicator indicates an offset value from the slot of PSFCH which carries the third feedback information 526 to the slot of PUCCH which carries the third HARQ-ACK information 528. For example, the fifth SL information 522 may be indicated with an offset value of 2 indicating the corresponding HARQ ACK/NACK is to be transmitted 2 slots after the slot of the third feedback information 526. The first HARQ information 508, the second HARQ information 518, and/or the third HARQ information 528 may be transmitted via PUCCH.

An aspect of the present disclosure includes a PSSCH group concept where SL HARQ ACK retransmission triggering is in the unit of PSSCH groups. For sidelink HARQ-ACK reporting to the BS, an aspect includes supporting two groups when enhanced dynamic codebook is configured for sidelink. An explicit group index may be included in DCI format 3_0 scheduling the PSSCH. Another aspect includes a NSFI for each PSSCH group in DCI format 3_0. The NSFI may operate as a toggle bit. For non-scheduled group, the NSFI field may be configurable by RRC. The size of a group may increase when more PSSCH of the same group is granted, and/or until the NSFI for the group flips. The group size may increase before or after the ACK is transmitted. The T-SAI and/or the C-SAI may be counted per group and may count until the NSFI flips.

In one example, in DCI 3_0, an aspect of the present disclosure may include adding one bit for HARQ ACK triggering, with "0" means only reporting HARQ-ACK information for the scheduled group and "1" means reporting HARQ-ACK information for both groups. When both PSSCH groups are triggered, the placement of HARQ ACK feedback for the two groups may be ordered based on increasing group index. For the scheduled group, one or more of the following fields may be included in DCI format 3_0: C-SAI (e.g., 2 bits), T-SAI (e.g., 2 bits) in case SL CA is supported, and/or NSFI (e.g., 1 bit). In some aspects, the C-SAI and/or the T-SAI may be accumulated within a PSSCH group until NSFI for the PSSCH group is toggled. The C-SAI and/or the T-SAI may be reset when the NSFI is toggled. The C-SAI and/or the T-SAI may not be reset by PUCCH transmission occasions. For the non-scheduled group, one or more of the following fields may be included in DCI format 3_0: NSFI (e.g., 1 bit) and/or T-SAI field (e.g., 2 bits). Whether the NSFI field and/or the T-SAI field is included may be configured by RRC.

Figure 6:
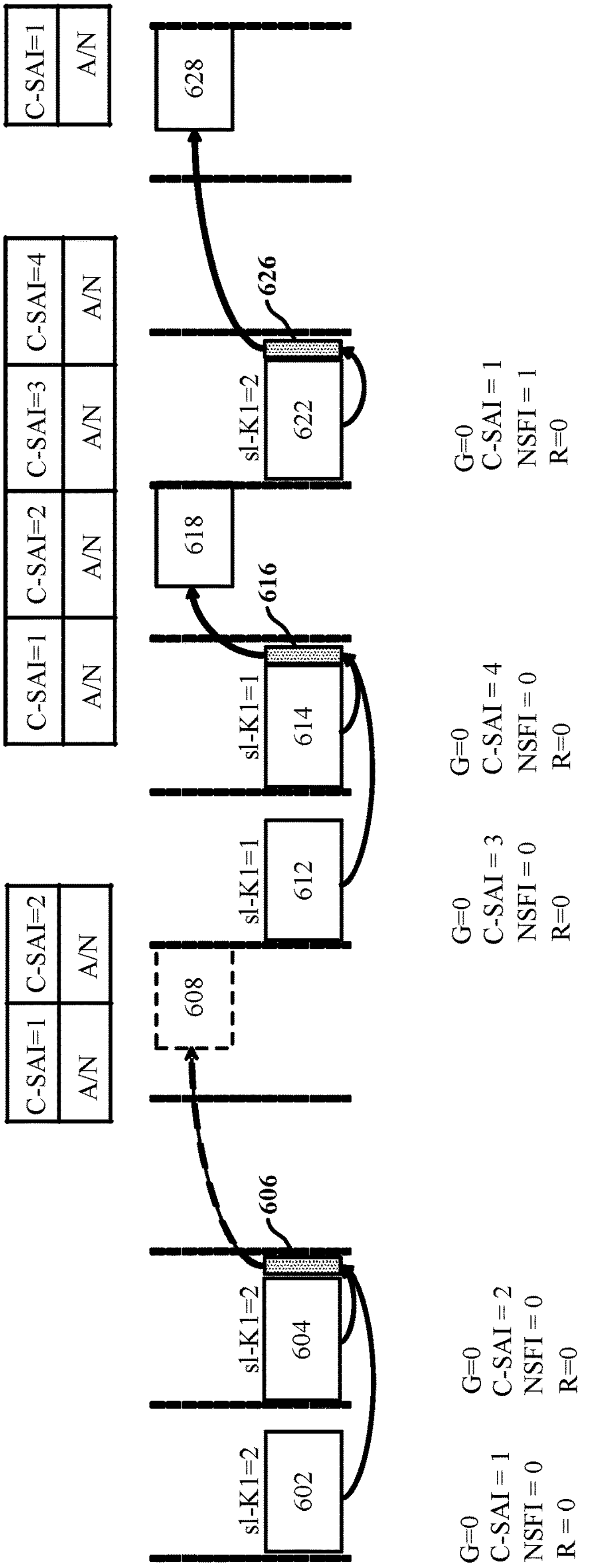
FIG. 6 illustrates another example of a timing diagram showing transmission of one or more groups of sidelink acknowledgements according to aspects of the present disclosure.

FIG. 6 illustrates another example of a timing diagram showing transmission of one or more groups of sidelink acknowledgements. In some aspects, additionally referencing FIG. 4, the TX UE 110*a* may transmit first SL information 602 and second SL information 604 to the RX UE 110*b*. The first SL information 602 and the second SL information 604 may be in a same group (indicated by group index value of G=0). The RX UE 110*b* may transmit first feedback information 606 to the TX UE 110*a* indicating the successful or failed reception and/or decoding of the first SL information 602 and/or the second SL information 604.

In some aspects, the TX UE 110*a* may report first HARQ information 608 associated with the first feedback information 606. The number of requested groups value (i.e., R=0) in the last DCI (e.g., the last DCI is the DCI scheduling the second SL information 604) among the DCIs scheduling the first SL information 601 and second SL information 604 may indicate that only the HARQ-ACK information of the scheduled group is reported. The TX UE 110*a* may successfully transmit or fail to transmit the first HARQ information 608 (as indicated by the dashed lines). The slot location of the resources for transmitting the first HARQ information 608 may be determined based on the PSFCH-to-HARQ_feedback timing indicator field value (i.e., sl-K1 in the figure) in the DCIs scheduling the SL information 602 and 604 wherein the PSFCH-to-HARQ_feedback indicator indicates an offset value from the slot of PSFCH which carries the first feedback information 606 to the slot of PUCCH which carries the first HARQ-ACK information 608. For example, the first SL information 602 may be indicated with an offset value of 2 indicating the corresponding HARQ ACK/NACK is to be transmitted 2 slots after the first feedback information 606. The second SL information 604 may be indicated with an offset value of 2 indicating the corresponding HARQ ACK/NACK is to be transmitted 2 slots after the first feedback information 606. The DCI scheduling the first SL information 602 may include a C-SAI value of 1 indicating the first position in the current group. The DCI scheduling the second SL information 604 may include a C-SAI value of 2 indicating the second position in the current group. The NSFI received by the TX UE 110*a* (e.g., received in the DCI for scheduling the first SL information 602 and/or the second SL information 604) may remain unchanged (e.g., value of 0) from a previous NSFI.

In some aspects, the TX UE 110*a* may transmit third SL information 612 and fourth SL information 614 to the RX UE 110*b*. The third SL information 612 and the fourth SL information 614 may be in a same group as each other and the first SL information 602 and the second SL information 604 (indicated by group index value of G=0). The RX UE 110*b* may transmit second feedback information 616 to the TX UE 110*a* indicating the successful or failed reception and/or decoding of the third SL information 612 and/or the fourth SL information 614. The TX UE 110*a* may report second HARQ information 618 (discussed below). The number of requested group value (i.e., R=0) in the last DCI (e.g., the last DCI is the DCI scheduling the fourth SL information 614) among the DCIs scheduling the first SL information 602, second SL information 604, third SL information 612 and fourth SL information 614 may indicate that only the HARQ ACK/NACK of the scheduled group is reported. The slot location of the resources for transmitting the second HARQ information 618 may be determined based on the PSFCH-to-HARQ_feedback timing indicator field value (i.e., sl-K1 in the figure) in the DCIs scheduling the SL information 612 and 614 wherein the PSFCH-to-HARQ_feedback indicator indicates an offset value from the slot of PSFCH which carries the second feedback information 616 to the slot of PUCCH which carries the second HARQ-ACK information 618. For example, the third SL information 612 may be indicated with an offset value of 1 indicating the corresponding HARQ ACK/NACK is to be transmitted 1 slots after the slot of the second feedback information 616. The fourth SL information 614 may be indicated with an offset value of 1 indicating the corresponding HARQ ACK/NACK is to be transmitted 1 slot after the slot of the second feedback information 616. The DCI scheduling the third SL information 612 may include a C-SAI value of 3 indicating the third position in the current group. The DCI scheduling the fourth SL information 614 may include a C-SAI value of 4 indicating the fourth position in the current group. The NSFI received by the TX UE 110*a* (e.g., received in DCI for scheduling the third SL information 612 and/or the fourth SL information 614) may remain unchanged (e.g., value of 0) from a previous NSFI.

In an aspect of the present disclosure, the second HARQ information 618 may include the HARQ-ACK information corresponding to the first SL information 602, the second SL information 604, the third SL information 612, and the fourth SL information 614. The HARQ-ACK information corresponding to the first SL information 602 and the second SL information 604 may be transmitted to the BS 105 for the first time (if the TX UE 110*a* failed to transmit the first HARQ information 608 previously) or retransmitted to the BS 105 (if the TX UE 110*a* successfully transmitted the first HARQ information 608 previously).

In some aspects of the current disclosure, the TX UE 110*a* may transmit fifth SL information 622 to the RX UE 110*b*. The fifth SL information 622 may be in a same group as the first SL information 602 to the fourth SL information 614 (indicated by group index value of G=0). The NSFI received by the TX UE 110*a* (e.g., received in DCI for scheduling the fifth SL information 622) may "flip" (toggling to the value of 1). As a result, the C-SAI value of the fifth SL information 622 may reset to 1. The RX UE 110*b* may transmit third feedback information 626 to the TX UE 110*a* indicating the successful or failed reception and/or decoding of the fifth SL information 622. The TX UE 110*a* may report third HARQ information 628. Due to the NSFI "flip," the third HARQ information 628 may include HARQ ACK/NACK corresponding to only the fifth SL information 622. The slot location of the resources for transmitting the third feedback information 626 may be determined based on the PSFCH-to-HARQ_feedback timing indicator field value (i.e., sl-K1 in the figure) in the DCI scheduling the SL information 622 wherein the PSFCH-to-HARQ_feedback indicator indicates an offset value from the slot of PSFCH which carries the third feedback information 626 to the slot of PUCCH which carries the second HARQ-ACK information 628. For example, the fifth SL information 622 may be associated with an offset value of 2 indicating the corresponding HARQ ACK/NACK is to be transmitted 2 slots after the slot of third feedback information 626. The first HARQ information 608, the second HARQ information 618, and/or the third HARQ information 628 may be transmitted via PUCCH.

Figure 7:
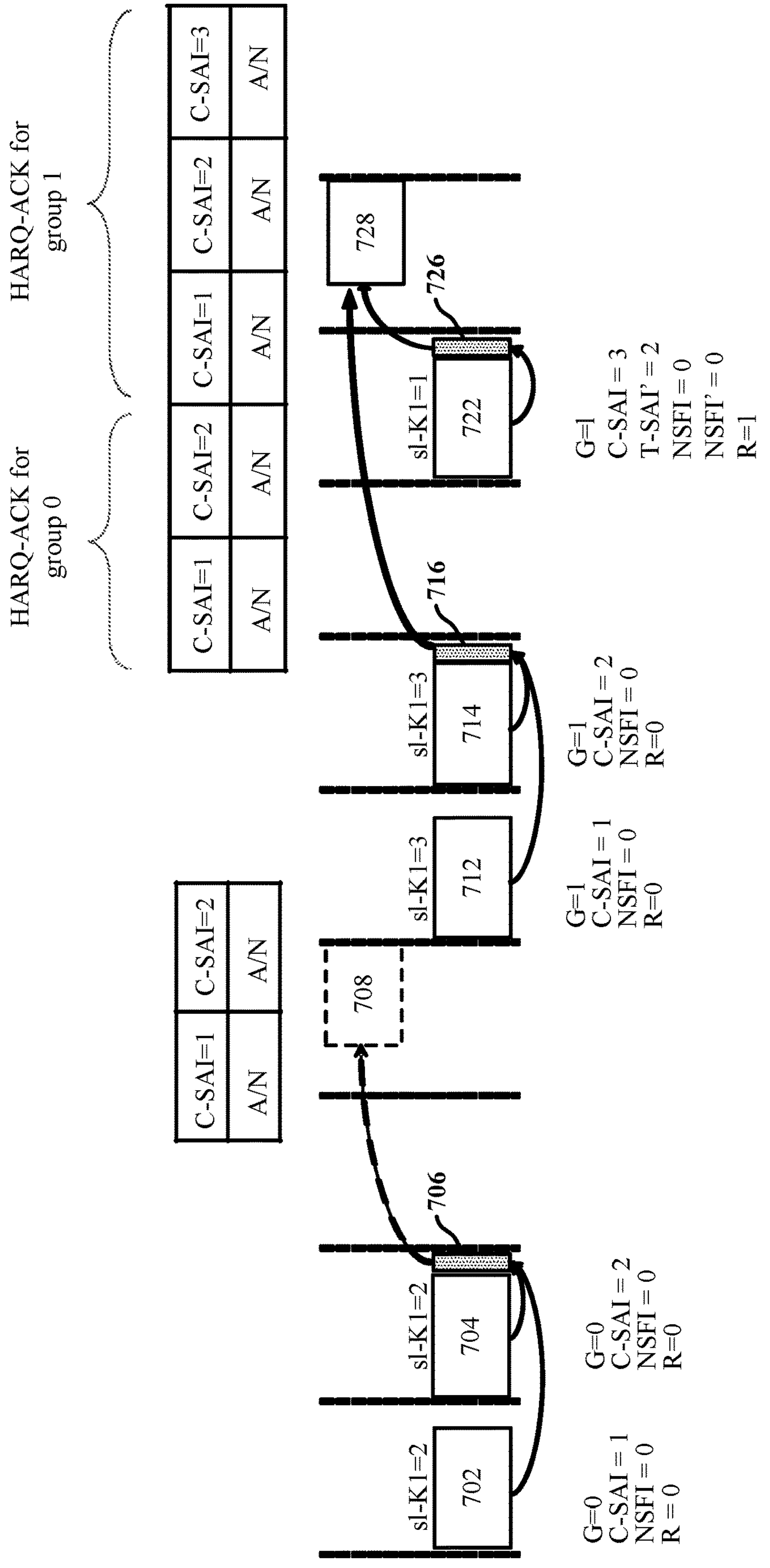
FIG. 7 illustrates another example of a timing diagram showing transmission of two or more groups of sidelink acknowledgements according to aspects of the present disclosure.

FIG. 7 illustrates another example of a timing diagram showing transmission of two or more groups of sidelink acknowledgements. In some aspects, additionally referencing FIG. 4, the TX UE 110*a* may transmit first SL information 702 and second SL information 704 to the RX UE 110*b*. The first SL information 702 and the second SL information 704 may be in a same group (indicated by group index value of G=0). The RX UE 110*b* may transmit first feedback information 706 to the TX UE 110*a* indicating the successful or failed reception and/or decoding of the first SL information 702 and/or the second SL information 704.

In some aspects, the TX UE 110*a* may report first HARQ information 708 associated with the first feedback information 706. The number of requested group value (i.e., R=0) in the last DCI (e.g., the last DCI is the DCI scheduling the second SL information 604) among the DCIs scheduling the first SL information 602, second SL information 604 may indicate that only the HARQ ACK/NACK of the scheduled group is reported. The TX UE 110*a* may successfully transmit or fail to transmit the first HARQ information 708 (as indicated by the dashed lines). The slot location of the resources for transmitting the first HARQ information 708 may be determined based on the PSFCH-to-HARQ_feedback timing indicator field value (i.e., sl-K1 in the figure) in the DCIs scheduling the SL information 702 and SL information 704 wherein the PSFCH-to-HARQ_feedback indicator indicates an offset value from the slot of PSFCH which carries the first feedback information 706 to the slot of PUCCH which carries the first HARQ-ACK information 708. For example, the first SL information 702 may be indicated with an offset value of 2 indicating the corresponding HARQ ACK/NACK is to be transmitted 2 slots after the first feedback information 706. The second SL information 704 may be indicated with an offset value of 2 indicating the corresponding HARQ ACK/NACK is to be transmitted 2 slots after the first feedback information 706. The DCI scheduling the first SL information 702 may include a C-SAI value of 1 indicating the first position in the current group. The DCI scheduling the second SL information 704 may include a C-SAI value of 2 indicating the second position in the current group. The latest NSFI received by the TX UE 110*a* (e.g., received in DCI for scheduling the second SL information 704) may remain unchanged (e.g., value of 0) from a previous NSFI with the same group.

In some aspects, the TX UE 110*a* may transmit third SL information 712 and fourth SL information 714 to the RX UE 110*b*. The third SL information 712 and the fourth SL information 714 may be in a different group as the first SL information 702 and the second SL information 704 (indicated by group index value of G=1). The RX UE 110*b* may transmit second feedback information 716 to the TX UE 110*a* indicating the successful or failed reception and/or decoding of the third SL information 712 and/or the fourth SL information 714. The TX UE 110*a* may be scheduled to report second HARQ information 728. The slot location of the resources for transmitting the second HARQ information 728 may be determined based on the PSFCH-to-HARQ-_feedback timing indicator field value (i.e., sl-K1 in the figure) in the DCIs scheduling the SL information 712 and SL information 714 wherein the PSFCH-to-HARQ_feedback indicator indicates an offset value from the slot of PSFCH which carries the second feedback information 716 to the slot of PUCCH which carries the second HARQ-ACK information 728. For example, the third SL information 712 may be associated with an offset value of 3 indicating the corresponding HARQ ACK/NACK is to be transmitted 3 slot after the slot of the second feedback information 716. The fourth SL information 714 may be associated with an offset value of 3 indicating the corresponding HARQ ACK/NACK is to be transmitted 3 slot after the slot of the second feedback information 716. The DCI scheduling the third SL information 712 may include a C-SAI value of 1 indicating the first position in the current group (e.g., R=1) different than the previous group. The DCI scheduling the fourth SL information 714 may include a C-SAI value of 2 indicating the second position in the current group. The latest NSFI received by the TX UE 110*a* (e.g., received in DCI for scheduling the fourth SL information 714) may remain unchanged (e.g., value of 0) from a previous NSFI with the same group.

Prior to the transmission of the second HARQ information 728, the TX UE 110*a* may transmit fifth SL information 722 to the RX UE 110*b*. The latest NSFI (associated with the scheduled group, G=1) received by the TX UE 110*a* (e.g., received in DCI for scheduling the fifth SL information 722) may remain unchanged. The RX UE 110*b* may transmit third feedback information 726 to the TX UE 110*a* indicating the successful or failed reception and/or decoding of the fifth SL information 722. The number of requested group value (i.e., R=1) in the last DCI (e.g., the last DCI is the DCI that schedules the fifth SL information 722) among the DCIs scheduling the first SL information 702 to the fourth SL information 714 may indicate that the HARQ-ACK information of both the scheduled group and the non-scheduled group are to be reported. The NSFI' (associated with the non-scheduled group) received by the TX UE 110*a* in the last DCI may have a value of 0, indicating that the NSFI value of the non-scheduled group (the first SL information 702 and the second SL information 704) is 0. The T-SAI' (associated with the non-scheduled group) received by the TX UE 110*a* in the last DCI may have a value of 2, indicating that two HARQ-ACK information bits associated with SL information from the non-scheduled group (i.e., the first SL information 702 and the second SL information 704) is to be included in the second HARQ information 728.

In an aspect of the present disclosure, the second HARQ information 728 may include the HARQ ACK/NACK corresponding to the first SL information 702, the second SL information 704, the third SL information 712, the fourth SL information 714, and the fifth SL information 722. The HARQ-ACK information corresponding to the first SL information 702 and the second SL information 704 may be transmitted to the BS 105 for the first time (if the TX UE 110*a* failed to transmit the first HARQ information 708 previously) or retransmitted to the BS 105 (if the TX UE 110*a* successfully transmitted the first HARQ information 708 previously). The first HARQ information 708 and/or the second HARQ information 728 may be transmitted via PUCCH.

In some aspects of the present disclosure, if the enhanced dynamic HARQ ACK codebook is configured for SL and two groups are supported, the presence of UL SAI for an additional PSSCH group in the non-fallback DCI (i.e., DCI format 0_1) may be configured by RRC. If the UL SAI is configured to be present in the non-fallback DCI (i.e., DCI format 0_1) for two groups, the UL SAI fields may apply separately to each group. For example, the most significant bits (MSBs) of the UL SAI field in the DCI format 0_1 may be used for group #0, and the least significant bits (LSBs) of the UL SAI field in the DCI format 0_1 may be used for group #1. If the UL SAI is configured to be present in the non-fallback DCI (i.e., DCI format 0_1) for only one group, then for enhanced dynamic HARQ-ACK codebook in PUSCH, the following may be implemented. If feedback is requested for just one group, then the UL SAI may apply to the reported group. If feedback is requested for both groups, then the UL SAI may apply to group #0 and the UE may derive the SAI for group #1 by the latest DCI (i.e., DCI format 3_0) scheduling PSSCH transmission for group #1 for this HARQ feedback occasion.

Figure 8:
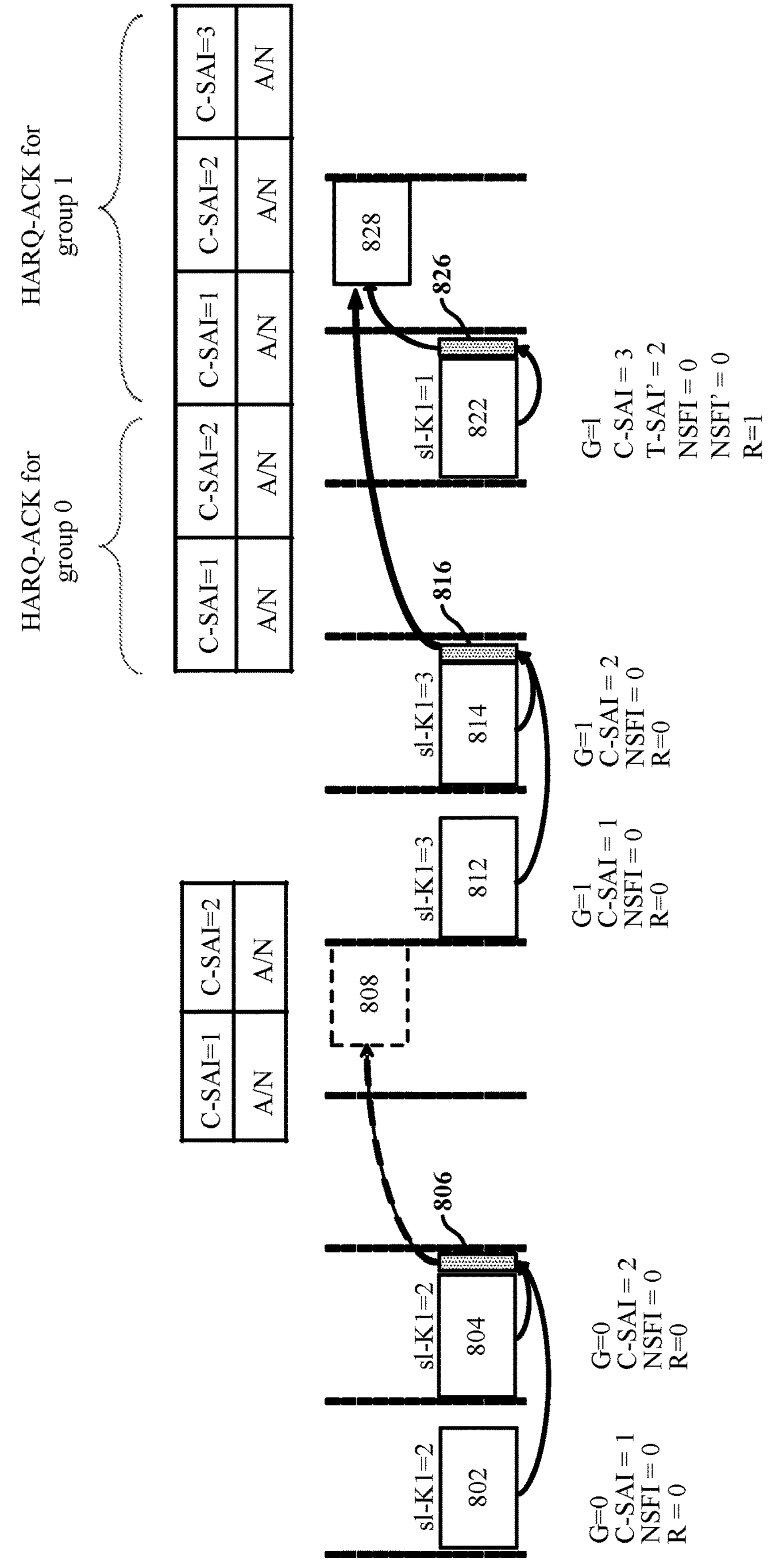
FIG. 8 illustrates another example of a timing diagram showing transmission of two or more groups of sidelink acknowledgements in one or more uplink shared channels according to aspects of the present disclosure.

FIG. 8 illustrates another example of a timing diagram showing transmission of two or more groups of sidelink acknowledgements in one or more uplink shared channels. In some aspects, additionally referencing FIG. 4, the TX UE 110*a* may transmit first SL information 802 and second SL information 804 to the RX UE 110*b*. The first SL information 802 and the second SL information 804 may be in a same group (indicated by group index value of G=0). The RX UE 110*b* may transmit first feedback information 806 to the TX UE 110*a* indicating the successful or failed reception and/or decoding of the first SL information 802 and/or the second SL information 804.

In some aspects, the TX UE 110*a* may report first HARQ information 808 associated with the first feedback information 806. The number of requested group value (i.e., R=0) in the last DCI (e.g., the last DCI is the DCI scheduling the second SL information 804) among the DCIs scheduling the first SL information 802 and second SL information 804 may indicate that only the HARQ ACK/NACK of the scheduled group is reported. The TX UE 110*a* may successfully transmit or fail to transmit the first HARQ information 808 (as indicated by the dashed lines). The slot location of the resources for transmitting the first HARQ information 808 may be determined based on the PSFCH-to-HARQ_feedback timing indicator field value (i.e., sl-K1 in the figure) in the DCIs scheduling the SL information 802 and SL information 804 wherein the PSFCH-to-HARQ_feedback indicator indicates an offset value from the slot of PSFCH which carries the first feedback information 806 to the slot of PUCCH which carries the first HARQ-ACK information 808. For example, the first SL information 802 may be indicated with an offset value of 2 indicating the corresponding HARQ ACK/NACK is to be transmitted 2 slots after the slot of the first feedback information 806. The second SL information 804 may be indicated with an offset value of 2 indicating the corresponding HARQ ACK/NACK is to be transmitted 2 slots after the slot of the first feedback information 806. The DCI scheduling the first SL information 802 may include a C-SAI value of 1 indicating the first position in the current group. The DCI scheduling the second SL information 804 may include a C-SAI value of 2 indicating the second position in the current group. The latest NSFI received by the TX UE 110*a* (e.g., received in DCI for scheduling the second SL information 804) may remain unchanged (e.g., value of 0) from a previous NSFI with the same group.

In some aspects, the TX UE 110*a* may transmit third SL information 812 and fourth SL information 814 to the RX UE 110*b*. The third SL information 812 and the fourth SL information 814 may be in a different group as the first SL information 802 and the second SL information 804 (indicated by group index value of G=1). The RX UE 110*b* may transmit second feedback information 816 to the TX UE 110*a* indicating the successful or failed reception and/or decoding of the third SL information 812 and/or the fourth SL information 814. The TX UE 110*a* may be scheduled to report second HARQ information 828. The slot location of the resources for transmitting the second HARQ information 828 may be determined based on the PSFCH-to-HARQ-_feedback timing indicator field value (i.e., sl-K1 in the figure) in the DCIs scheduling the SL information 812 and SL information 814 wherein the PSFCH-to-HARQ_feedback indicator indicates an offset value from the slot of PSFCH which carries the second feedback information 816 to the slot of PUCCH which carries the second HARQ-ACK information 828. For example, the third SL information 812 may be indicated with an offset value of 2 indicating the corresponding HARQ ACK/NACK is to be transmitted 2 slot after he slot of the second feedback information 816. The fourth SL information 814 may be associated with an offset value of 3 indicating the corresponding HARQ ACK/NACK is to be transmitted 3 slot after the slot of the second feedback information 816. The DCI scheduling the third SL information 812 may include a C-SAI value of 1 indicating the first position in the current group. The DCI scheduling the third SL information 812 may include a C-SAI value of 2 indicating the second position in the current group. The latest NSFI received by the TX UE 110*a* (e.g., received in DCI for scheduling the fourth SL information 814) may remain unchanged (e.g., value of 0) from a previous NSFI with the same group.

Prior to the transmission of the second HARQ information 828, the TX UE 110*a* may transmit fifth SL information 822 to the RX UE 110*b*. The latest NSFI (associated with the scheduled group, G=1) received by the TX UE 110*a* (e.g., received in DCI for scheduling the fifth SL information 822) may remain unchanged. The RX UE 110*b* may transmit third feedback information 826 to the TX UE 110*a* indicating the successful or failed reception and/or decoding of the fifth SL information 822. The number of requested group value (i.e., R=1) in the last DCI (e.g., the last DCI is the DCI that schedules the fifth SL information 822) among the DCIs scheduling the first SL information 802 to the fourth SL information 814 may indicate that the HARQ ACK/NACK of both the scheduled group and the non-scheduled group are to be reported. The NSFI' (associated with the non-scheduled group) received by the TX UE 110*a* in the last DCI may have a value of 0, indicating that the NSFI value of the non-scheduled group (the first SL information 802 and the second SL information 804) is 0. The T-SAI' (associated with the non-scheduled group) received by the TX UE 110*a* may have a value of 2, indicating that two HARQ-ACK information bits associated with SL information from the non-scheduled group (i.e., the first SL information 802 and the second SL information 804) is to be included in the second HARQ information 828.

In certain aspects, the second HARQ information 828 may at least partially overlap with one or more PUSCH transmissions. As described below, the HARQ information 828 may be transmitted in a PUSCH scheduled by a non-fallback DCI.

In some aspects of the present disclosure, the presence of UL SAI for an additional PSSCH group in the non-fallback DCI (i.e., DCI format 0_1) may be configured by RRC. In one aspect, if the UL SAI is configured to be present for two groups, the most significant bits (MSBs) of the UL SAI may be used for a first group (e.g., group G=0) and the least significant bits (LSBs) of the UL SAI may be used for a second group (e.g., group G=1).

In another aspect, if the UL SAI is configured to be present for one group and feedback is requested by the BS 105 for one group, the Tx UE 110*a* may apply the UL SAI to the reported group. In some other aspect, if the UL SAI is configured to be present for one group and feedback is requested by the BS 105 for two groups, the TX UE 110*a* may apply the UL SAI to a first group (e.g., group G=0) and derive the UL SAI for a second group (e.g., group G=1) based on the latest DCI (i.e., the DCI for scheduling the transmission of the fifth SL information 822.

In some aspects, the TX UE 110*a* may transmit the second HARQ information 828 to the BS 105. The second HARQ information 828 may include the HARQ ACK/NACK corresponding to the first SL information 802, the second SL information 804, the third SL information 812, the fourth SL information 814, and the fifth SL information 822. The HARQ-ACK information corresponding to the first SL information 802 and the second SL information 804 may be transmitted to the BS 105 for the first time (if the TX UE 110*a* failed to transmit the first HARQ information 808 previously) or retransmitted to the BS 105 (if the TX UE 110*a* successfully transmitted the first HARQ information 808 previously). The second HARQ information 828 may be transmitted via a PUSCH.

Figure 9:
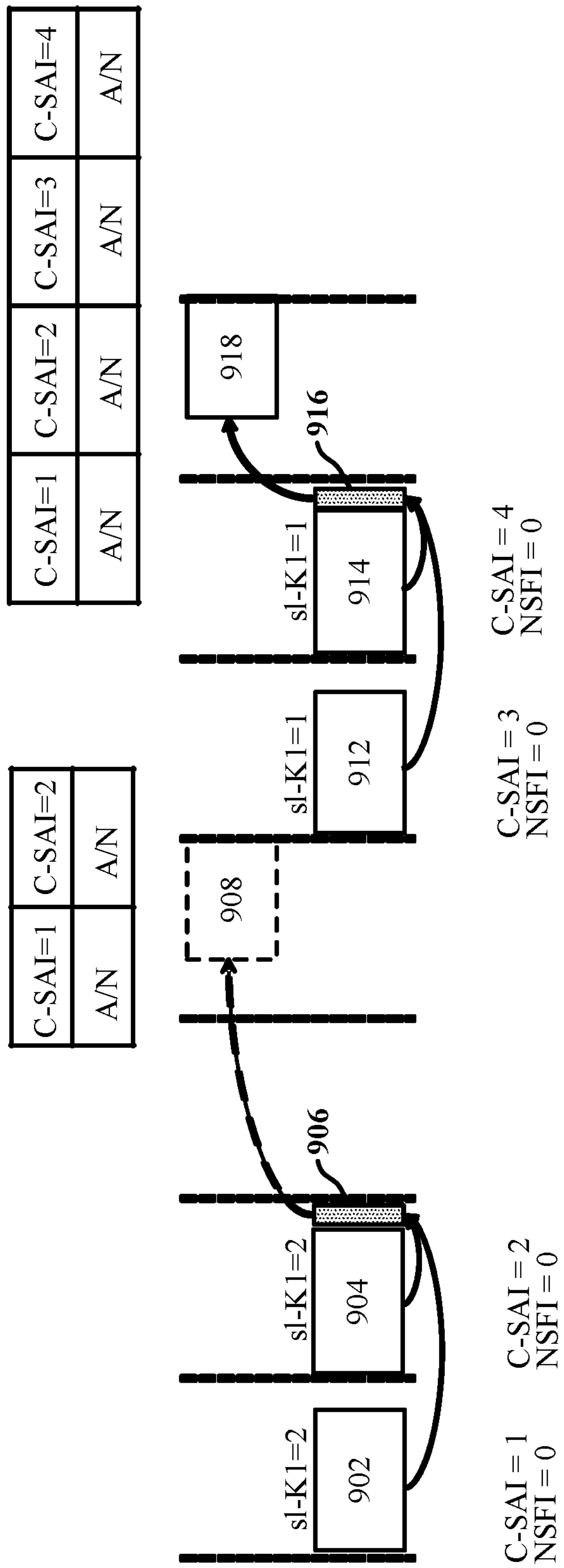
FIG. 9 illustrates an example of a timing diagram showing transmission of sidelink acknowledgements in one or more uplink shared channels according to aspects of the present disclosure.

FIG. 9 illustrates an example of a timing diagram showing transmission of sidelink acknowledgements in one or more uplink shared channels. In some aspects, additionally referencing FIG. 4, the TX UE 110*a* may transmit first SL information 902 and second SL information 904 to the RX UE 110*b*. The RX UE 110*b* may transmit first feedback information 906 to the TX UE 110*a* indicating the successful or failed reception and/or decoding of the first SL information 902 and/or the second SL information 904.

In some aspects, the TX UE 110*a* may report first HARQ information 908 associated with the first feedback information 906. The TX UE 110*a* may successfully transmit or fail to transmit the first HARQ information 908 (as indicated by the dashed lines). The slot location of the resources for transmitting the first HARQ information 908 may be determined based on the PSFCH-to-HARQ_feedback timing indicator field value (i.e., sl-K1 in the figure) in the DCIs scheduling the SL information 902 and SL information 904 wherein the PSFCH-to-HARQ_feedback indicator indicates an offset value from the slot of PSFCH which carries the first feedback information 906 to the slot of PUCCH which carries the first HARQ-ACK information 908. For example, the first SL information 902 may be indicated with an offset value (sl-K1) of 2 indicating the corresponding HARQ ACK/NACK is to be transmitted 2 slots after the slot of the first feedback information 906. The second SL information 904 may be indicated with an offset value of 2 indicating the corresponding HARQ ACK/NACK is to be transmitted 2 slots after the slot of the first feedback information 906. The DCI scheduling the first SL information 902 may include a C-SAI value of 1 indicating the first position in the current group. The DCI scheduling the second SL information 904 may include a C-SAI value of 2 indicating the second position in the current group. The latest NSFI received by the TX UE 110*a* (e.g., received in DCI for scheduling the first SL information 902 and/or the second SL information 904) may remain unchanged (e.g., value of 0) from a previous NSFI.

In some aspects, the TX UE 110*a* may transmit third SL information 912 and fourth SL information 914 to the RX UE 110*b*. The RX UE 110*b* may transmit second feedback information 916 to the TX UE 110*a* indicating the successful or failed reception and/or decoding of the third SL information 912 and/or the fourth SL information 914. The TX UE 110*a* may report second HARQ information 918 (discussed below). The slot location of the resources for transmitting the second HARQ information 918 may be determined based on the PSFCH-to-HARQ_feedback timing indicator field value (i.e., sl-K1 in the figure) in the DCIs scheduling the SL information 912 and SL information 904 wherein the PSFCH-to-HARQ_feedback indicator indicates an offset value from the slot of PSFCH which carries the second feedback information 916 to the slot of PUCCH which carries the second HARQ-ACK information 918. For example, the third SL information 912 may be indicated with an offset value of 1 indicating the corresponding HARQ ACK/NACK is to be transmitted 1 slots after the slot of the second feedback information 916. The fourth SL information 914 may be indicated with an offset value of 1 indicating the corresponding HARQ ACK/NACK is to be transmitted 1 slot after the slot of the second feedback information 916. The DCI scheduling the third SL information 912 may include a C-SAI value of 3 indicating the third position in the current group. The DCI scheduling the third SL information 912 may include a C-SAI value of 4 indicating the fourth position in the current group. The NSFI received by the TX UE 110*a* (e.g., received in DCI for scheduling the fourth SL information 914) may remain unchanged (e.g., value of 0) from the previous NSFI.

In certain aspects, the second HARQ information 918 may at least partially overlap with one or more PUSCH transmissions. As described below, the HARQ information 918 may be transmitted in a PUSCH scheduled by a non-fallback DCI.

In an aspect, if the UL SAI is configured to be present for one group and feedback is requested for one group, the UL SAI may be applied to the requested group.

In an aspect of the present disclosure, the second HARQ information 918 may include the HARQ-ACK information corresponding to the first SL information 902, the second SL information 904, the third SL information 912, and the fourth SL information 914. The HARQ-ACK information corresponding to the first SL information 902 and the second SL information 904 may be transmitted to the BS 105 for the first time (if the TX UE 110*a* failed to transmit the first HARQ information 908 previously) or retransmitted to the BS 105 (if the TX UE 110*a* successfully transmitted the first HARQ information 908 previously). The second HARQ information 918 may be transmitted via PUSCH.

Figure 10:
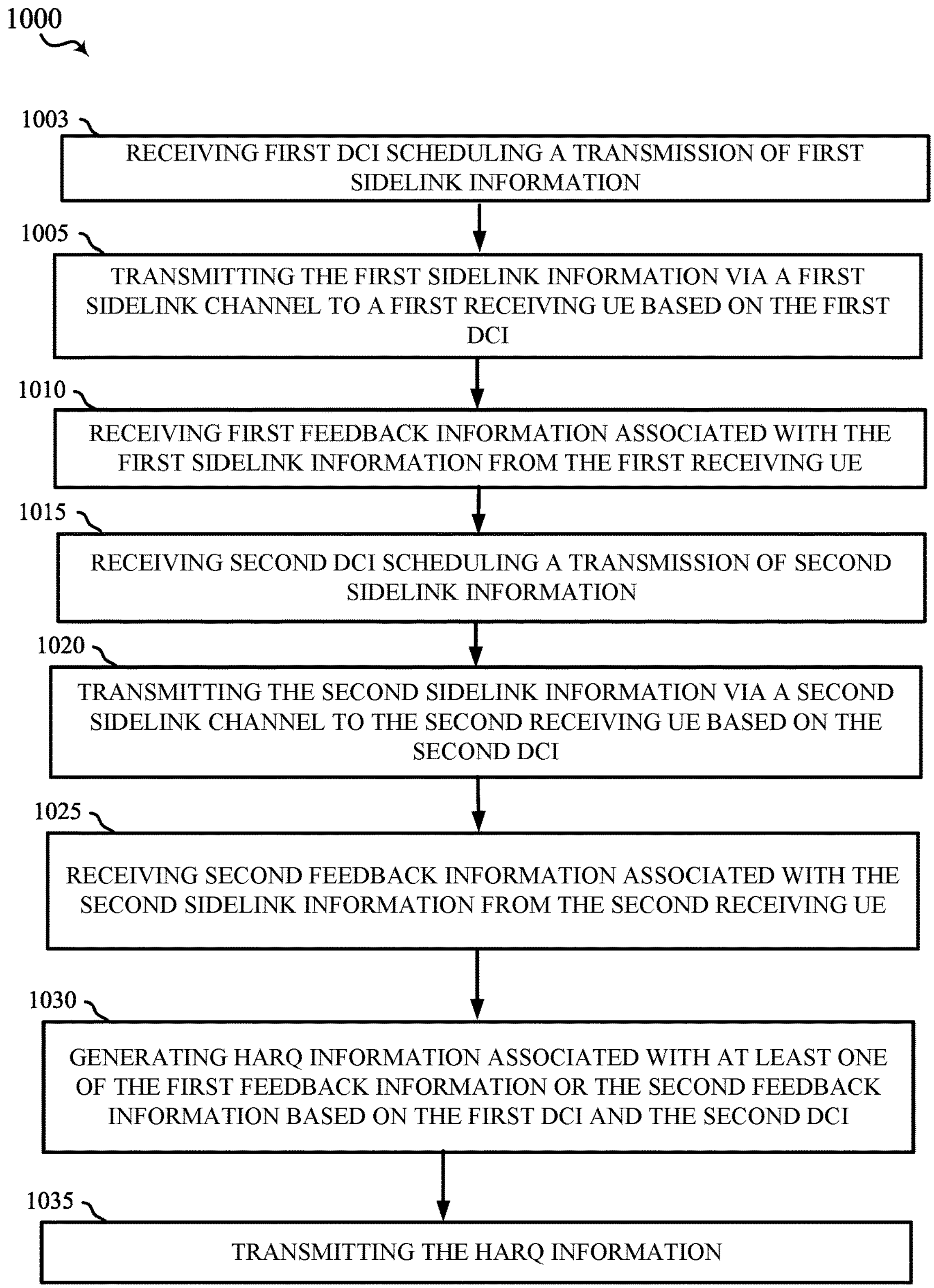
FIG. 10 illustrates an example of a method of transmitting or retransmitting sidelink acknowledgements according to aspects of the present disclosure.

FIG. 10 illustrates an example of a method of transmitting or retransmitting sidelink acknowledgements. For example, a method 1000 may be performed by the one or more of the processor 212, the memory 216, the applications 275, the modem 220, the transceiver 202, the receiver 206, the transmitter 208, the RF front end 288, the communication component 222, the HARQ component 224, and/or one or more other components of the UE 110 in the wireless communication network 100.

At block 1003, the method 1000 may receive first DCI scheduling a transmission of first sidelink information. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may receive first DCI scheduling a transmission of first sidelink information as described above. The RF front end 288 may receive the electrical signals converted from electro-magnetic signals. The RF front end 288 may filter and/or amplify the electrical signals. The transceiver 202 or the receiver 206 may convert the electrical signals to digital signals, and send the digital signals to the communication component 222.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for receiving first DCI scheduling a transmission of first sidelink information.

At block 1005, the method 1000 may transmit the first sidelink information via a first sidelink channel to a first receiving UE based on the first DCI. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may transmit the first sidelink information via a first sidelink channel to a first receiving UE based on the first DCI as described above. The communication component 222 may send the digital signals to the transceiver 202 or the transmitter 208. The transceiver 202 or the transmitter 208 may convert the digital signals to electrical signals and send to the RF front end 288. The RF front end 288 may filter and/or amplify the electrical signals. The RF front end 288 may send the electrical signals as electro-magnetic signals via the one or more antennas 265.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for transmitting the first sidelink information via a first sidelink channel to a first receiving UE based on the first DCI.

At block 1010, the method 1000 may receive first feedback information associated with the first sidelink information from the first receiving UE. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may receive first feedback information associated with the first sidelink information from the first receiving UE as described above. The RF front end 288 may receive the electrical signals converted from electro-magnetic signals. The RF front end 288 may filter and/or amplify the electrical signals. The transceiver 202 or the receiver 206 may convert the electrical signals to digital signals, and send the digital signals to the communication component 222.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for receiving first feedback information associated with the first sidelink information from the first receiving UE.

At block 1015, the method 1000 may receive second DCI scheduling a transmission of second sidelink information. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may receive second DCI scheduling a transmission of second sidelink information as described above. The RF front end 288 may receive the electrical signals converted from electro-magnetic signals. The RF front end 288 may filter and/or amplify the electrical signals. The transceiver 202 or the receiver 206 may convert the electrical signals to digital signals, and send the digital signals to the communication component 222.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for receiving second DCI scheduling a transmission of second sidelink information.

At block 1020, the method 1000 may transmit the second sidelink information via a second sidelink channel to the second receiving UE based on the second DCI. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may transmit the second sidelink information via a second sidelink channel to the second receiving UE based on the second DCI as described above. The communication component 222 may send the digital signals to the transceiver 202 or the transmitter 208. The transceiver 202 or the transmitter 208 may convert the digital signals to electrical signals and send to the RF front end 288. The RF front end 288 may filter and/or amplify the electrical signals. The RF front end 288 may send the electrical signals as electro-magnetic signals via the one or more antennas 265.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for transmitting the second sidelink information via a second sidelink channel to the second receiving UE based on the second DCI.

At block 1025, the method 1000 may receive second feedback information associated with the second sidelink information from the second receiving UE. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may receive second feedback information associated with the second sidelink information from the second receiving UE as described above. The RF front end 288 may receive the electrical signals converted from electro-magnetic signals. The RF front end 288 may filter and/or amplify the electrical signals. The transceiver 202 or the receiver 206 may convert the electrical signals to digital signals, and send the digital signals to the communication component 222.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for receiving second feedback information associated with the second sidelink information from the second receiving UE.

At block 1030, the method 1000 may generate HARQ information associated with at least one of the first feedback information or the second feedback information based on the first DCI and the second DCI. For example, the HARQ component 224, the processor 212, the memory 216, the modem 220, and/or the applications 275 of the UE 110 may generate HARQ information associated with at least one of the first feedback information or the second feedback information based on the first DCI and the second DCI as described below.

In certain implementations, the HARQ component 224, the processor 212, the memory 216, the modem 220, and/or the applications 275 may be configured to and/or may define means for generating HARQ information associated with at least one of the first feedback information or the second feedback information based on the first DCI and the second DCI.

At block 1035, the method 1000 may transmit the HARQ information. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may transmit the HARQ information. The communication component 222 may send the digital signals to the transceiver 202 or the transmitter 208. The transceiver 202 or the transmitter 208 may convert the digital signals to electrical signals and send to the RF front end 288. The RF front end 288 may filter and/or amplify the electrical signals. The RF front end 288 may send the electrical signals as electromagnetic signals via the one or more antennas 265.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for transmitting the HARQ information.

Alternatively or additionally, the method 1000 may further include the method above, wherein the first DCI includes a sidelink feedback group indicator indicating a first value, the second DCI includes a sidelink feedback group indicator indicating a first value, and wherein generating the HARQ information comprises generating the HARQ information associated with both the first feedback information and the second feedback information in response to detections of the first DCI and the second DCI each providing a first value of the sidelink feedback group indicator.

Alternatively or additionally, the method 1000 may further include any of the methods above, wherein the first DCI indicates a first counter sidelink assignment index (C-SAI) value of the first sidelink information and the second DCI indicates a second C-SAI value of the second sidelink information, wherein the second C-SAI value sequentially follows the first C-SAI value.

Alternatively or additionally, the method 1000 may further include any of the methods above, further comprising receiving third DCI scheduling a transmission of third sidelink information and including a sidelink feedback group indicator, transmitting the third sidelink information via a third sidelink channel to a third receiving UE, receiving third feedback information associated with the third sidelink information from the third receiving UE, generating second HARQ information associated with the third feedback information and not associated with the first feedback information or the second feedback information based on detection of the third DCI providing a second value of the sidelink feedback group indicator, and transmitting the second HARQ information.

Alternatively or additionally, the method 1000 may further include any of the methods above, wherein the first DCI indicates a first counter sidelink assignment index (C-SAI) value of the first sidelink information, the second DCI indicates a second C-SAI value of the second sidelink information, wherein the second C-SAI value sequentially follows the first C-SAI value, and the third DCI indicates a third C-SAI value of the third sidelink information in response to the sidelink feedback group indicator indicating the second value, wherein the third C-SAI value does not sequentially follow the second C-SAI value.

Alternatively or additionally, the method 1000 may include any of the methods above, wherein the first DCI and second DCI includes one or more of a group index associated with a scheduled group, a plurality of sidelink feedback group indicators, wherein each of the plurality of sidelink feedback group indicators is associated with a corresponding group of one or more group, a number of requested groups indicating a number of the one or more group to be reported, and a plurality of total sidelink assignment indices (T-SAIs), wherein each of the plurality of T-SAIs is associated with a corresponding group of the one or more group.

Alternatively or additionally, the method 1000 may further include any of the methods above, wherein the number of requested groups in a last DCI of the first DCI and second DCI indicates one group and generating the HARQ information comprises generating the HARQ information associated with both the first feedback information and the second feedback information in response to detections of the first DCI and second DCI each providing a first group index and a first value of the sidelink feedback group indicator associated with the first group index.

Alternatively or additionally, the method 1000 may further include any of the methods above, wherein the first DCI indicates a first counter sidelink assignment index (C-SAI) value of the first sidelink information and the second DCI indicates a second C-SAI value of the second sidelink information, wherein the second C-SAI value sequentially follows the first C-SAI value.

Alternatively or additionally, the method 1000 may further include any of the methods above, further comprising receiving third DCI scheduling a transmission of third sidelink information and including at least one of, a group index, a sidelink feedback group indicator associated with the group index or a number of requested group, transmitting the third sidelink information via a third sidelink channel to a third receiving UE, receiving third feedback information associated with the third sidelink information from the third receiving UE, generating second HARQ information associated with the third feedback information and not associated with the first feedback information or the second feedback information based on the detections of the third DCI providing a first group index value and a second value of sidelink feedback group indicator associated with the first group or the third DCI providing a second group index value, and transmitting the second HARQ information based on detection of the third DCI providing one requested group.

Alternatively or additionally, the method 1000 may further include any of the methods above, wherein the first DCI indicates a first counter sidelink assignment index (C-SAI) value of the first sidelink information, the second DCI indicates a second C-SAI value of the second sidelink information, wherein the second C-SAI value sequentially follows the first C-SAI value, and the third DCI indicates a third C-SAI value of the third sidelink information in response to detections of the third DCI providing a first group index value and a second value of sidelink feedback group indicator associated with the first group or the third DCI providing a second group index value, wherein the third C-SAI value does not sequentially follow the second C-SAI value.

Alternatively or additionally, the method 1000 may further include any of the methods above, wherein the number of requested groups in a last DCI of the first DCI and second DCI indicates two groups, the first feedback information being associated with a first group of the two groups and the second feedback information being associated with a second group of the two groups, a first sidelink feedback group indicator of the plurality of sidelink feedback group indicators in the last DCI of the first DCI and second DCI indicating a first value or a second sidelink feedback group indicator of the plurality of sidelink feedback group indicators in the last DCI of the first DCI and second DCI indicating a second value, the first sidelink feedback group indicator is associated with the first group of the two groups or the second sidelink feedback group indicator is associated with the second group of the two groups, and generating the HARQ information comprises generating the HARQ information associated with the first feedback information and the second feedback information based on detections of the last DCI of the first DCI and second DCI providing two groups to be reported.

Alternatively or additionally, the method 1000 may further include any of the methods above, wherein generating the HARQ information associated with the first feedback information is based at least in part on the first sidelink feedback group indicator indicating the first value and generating the HARQ information associated with the second feedback information is based at least in part on the sidelink feedback group indicator indicating the second value.

Alternatively or additionally, the method 1000 may further include any of the methods above, further comprising appending the HARQ information associated with the first feedback information to the HARQ information associated with the second feedback information in response to the first group index value being larger than the second group index value or appending the HARQ information associated with the second feedback information to the HARQ information associated with the first feedback information in response to the first group index value being smaller than the second group index value.

Alternatively or additionally, the method 1000 may further include any of the methods above, wherein the first sidelink feedback group indicator is associated with a scheduled group, and the second sidelink feedback group indicator is associated with a non-scheduled group.

Alternatively or additionally, the method may further include any of the methods above, wherein physical uplink control channel (PUCCH) for transmitting the HARQ information overlaps at least a portion of a physical uplink shared channel (PUSCH) and transmitting the HARQ information comprises transmitting the HARQ information via the PUSCH.

Alternatively or additionally, the method 1000 may further include any of the methods above, further comprising receiving DCI scheduling the PUSCH for HARQ-ACK multiplexing and including uplink sidelink assignment index (UL-SAI) field for the two groups, wherein a first portion of bits in the UL-SAI field is allocated for the first group of the two groups and a second portion of the bits in the UL-SAI field is allocated for the second group of the two groups.

Alternatively or additionally, the method 1000 may further include any of the methods above, further comprising receiving DCI scheduling the PUSCH for HARQ-ACK multiplexing and including uplink sidelink assignment index (UL-SAI) field for one group of the two groups and receiving a feedback request for the one group, wherein the UL-SAI field is associated with the one group.

Alternatively or additionally, the method 1000 may further include any of the methods above, further comprising receiving DCI scheduling the PUSCH for HARQ-ACK multiplexing and including an uplink sidelink assignment index (UL-SAI) field for one group of the two groups, receiving a feedback request for the two groups, wherein the UL-SAI field is associated with the first group of the two groups, and deriving a sidelink assignment index for the second group based on a T-SAI of the plurality of T-SAIs.

ADDITIONAL IMPLEMENTATIONS

Aspects of the present disclosure include methods by a receiving user equipment (UE) for receiving first DCI scheduling a transmission of first sidelink information, transmitting the first sidelink information via a first sidelink channel to a first receiving UE based on the first DCI, receiving first feedback information associated with the first sidelink information from the first receiving UE, receiving second DCI scheduling a transmission of second sidelink information, transmitting the second sidelink information via a second sidelink channel to the second receiving UE based on the second DCI, receiving second feedback information associated with the second sidelink information from the second receiving UE, generating HARQ information associated with at least one of the first feedback information or the second feedback information based on the first DCI and the second DCI, and transmitting the HARQ information.

Aspects of the present disclosure include the method above, wherein the first DCI includes a sidelink feedback group indicator indicating a first value, the second DCI includes a sidelink feedback group indicator indicating a first value, and wherein generating the HARQ information comprises generating the HARQ information associated with both the first feedback information and the second feedback information in response to detections of the first DCI and the second DCI each providing a first value of the sidelink feedback group indicator.

Aspects of the present disclosure include any of the methods above, wherein the first DCI indicates a first counter sidelink assignment index (C-SAI) value of the first sidelink information and the second DCI indicates a second C-SAI value of the second sidelink information, wherein the second C-SAI value sequentially follows the first C-SAI value.

Aspects of the present disclosure include any of the methods above, further comprising receiving third DCI scheduling a transmission of third sidelink information and including a sidelink feedback group indicator, transmitting the third sidelink information via a third sidelink channel to a third receiving UE, receiving third feedback information associated with the third sidelink information from the third receiving UE, generating second HARQ information associated with the third feedback information and not associated with the first feedback information or the second feedback information based on detection of the third DCI providing a second value of the sidelink feedback group indicator, and transmitting the second HARQ information.

Aspects of the present disclosure include any of the methods above, wherein the first DCI indicates a first counter sidelink assignment index (C-SAI) value of the first sidelink information, the second DCI indicates a second C-SAI value of the second sidelink information, wherein the second C-SAI value sequentially follows the first C-SAI value, and the third DCI indicates a third C-SAI value of the third sidelink information in response to the sidelink feedback group indicator indicating the second value, wherein the third C-SAI value does not sequentially follow the second C-SAI value.

Aspects of the present disclosure include any of the methods above, wherein the first DCI and second DCI includes one or more of a group index associated with a scheduled group, a plurality of sidelink feedback group indicators, wherein each of the plurality of sidelink feedback group indicators is associated with a corresponding group of one or more group, a number of requested groups indicating a number of the one or more group to be reported, and a plurality of total sidelink assignment indices (T-SAIs), wherein each of the plurality of T-SAIs is associated with a corresponding group of the one or more group.

Aspects of the present disclosure include any of the methods above, wherein the number of requested groups in a last DCI of the first DCI and second DCI indicates one group and generating the HARQ information comprises generating the HARQ information associated with both the first feedback information and the second feedback information in response to detections of the first DCI and second DCI each providing a first group index and a first value of the sidelink feedback group indicator associated with the first group index.

Aspects of the present disclosure include any of the methods above, wherein the first DCI indicates a first counter sidelink assignment index (C-SAI) value of the first sidelink information and the second DCI indicates a second C-SAI value of the second sidelink information, wherein the second C-SAI value sequentially follows the first C-SAI value.

Aspects of the present disclosure include any of the methods above, further comprising receiving third DCI scheduling a transmission of third sidelink information and including at least one of, a group index, a sidelink feedback group indicator associated with the group index or a number of requested group, transmitting the third sidelink information via a third sidelink channel to a third receiving UE, receiving third feedback information associated with the third sidelink information from the third receiving UE, generating second HARQ information associated with the third feedback information and not associated with the first feedback information or the second feedback information based on the detections of the third DCI providing a first group index value and a second value of sidelink feedback group indicator associated with the first group or the third DCI providing a second group index value, and transmitting the second HARQ information based on detection of the third DCI providing one requested group.

Aspects of the present disclosure include any of the methods above, wherein the first DCI indicates a first counter sidelink assignment index (C-SAI) value of the first sidelink information, the second DCI indicates a second C-SAI value of the second sidelink information, wherein the second C-SAI value sequentially follows the first C-SAI value, and the third DCI indicates a third C-SAI value of the third sidelink information in response to detections of the third DCI providing a first group index value and a second value of sidelink feedback group indicator associated with the first group or the third DCI providing a second group index value, wherein the third C-SAI value does not sequentially follow the second C-SAI value.

Aspects of the present disclosure include any of the methods above, wherein the number of requested groups in a last DCI of the first DCI and second DCI indicates two groups, the first feedback information being associated with a first group of the two groups and the second feedback information being associated with a second group of the two groups, a first sidelink feedback group indicator of the plurality of sidelink feedback group indicators in the last DCI of the first DCI and second DCI indicating a first value or a second sidelink feedback group indicator of the plurality of sidelink feedback group indicators in the last DCI of the first DCI and second DCI indicating a second value, the first sidelink feedback group indicator is associated with the first group of the two groups or the second sidelink feedback group indicator is associated with the second group of the two groups, and generating the HARQ information comprises generating the HARQ information associated with the first feedback information and the second feedback information based on detections of the last DCI of the first DCI and second DCI providing two groups to be reported.

Aspects of the present disclosure include any of the methods above, wherein the generating the HARQ information comprises generating the HARQ information associated with the first feedback information is based at least in part on the first sidelink feedback group indicator indicating the first value and generating the HARQ information associated with the second feedback information is based at least in part on the sidelink feedback group indicator indicating the second value.

Aspects of the present disclosure include any of the methods above, further comprising appending the HARQ information associated with the first feedback information to the HARQ information associated with the second feedback information in response to the first group index value being larger than the second group index value or appending the HARQ information associated with the second feedback information to the HARQ information associated with the first feedback information in response to the first group index value being smaller than the second group index value.

Aspects of the present disclosure include any of the methods above, wherein the first sidelink feedback group indicator is associated with a scheduled group, and the second sidelink feedback group indicator is associated with a non-scheduled group.

Alternatively or additionally, the method may further include any of the methods above, wherein physical uplink control channel (PUCCH) for transmitting the HARQ information overlaps at least a portion of a physical uplink shared channel (PUSCH) and transmitting the HARQ information comprises transmitting the HARQ information via the PUSCH.

Aspects of the present disclosure include any of the methods above, further comprising receiving DCI scheduling the PUSCH for HARQ-ACK multiplexing and including uplink sidelink assignment index (UL-SAI) field for the two groups, wherein a first portion of bits in the UL-SAI field is allocated for the first group of the two groups and a second portion of the bits in the UL-SAI field is allocated for the second group of the two groups.

Aspects of the present disclosure include any of the methods above, further comprising receiving DCI scheduling the PUSCH for HARQ-ACK multiplexing and including uplink sidelink assignment index (UL-SAI) field for one group of the two groups and receiving a feedback request for the one group, wherein the UL-SAI field is associated with the one group.

Aspects of the present disclosure include any of the methods above, further comprising receiving DCI scheduling the PUSCH for HARQ-ACK multiplexing and including an uplink sidelink assignment index (UL-SAI) field for one group of the two groups, receiving a feedback request for the two groups, wherein the UL-SAI field is associated with the first group of the two groups, and deriving a sidelink assignment index for the second group based on a T-SAI of the plurality of T-SAIs.

Other aspects of the present disclosure include a receiving user equipment (UE) having a memory comprising instructions, a transceiver, and one or more processors operatively coupled with the memory and the transceiver, the one or more processors configured to execute instructions in the memory to receive first DCI scheduling a transmission of first sidelink information, transmit the first sidelink information via a first sidelink channel to a first receiving UE based on the first DCI, receive first feedback information associated with the first sidelink information from the first receiving UE, receive second DCI scheduling a transmission of second sidelink information, transmit the second sidelink information via a second sidelink channel to the second receiving UE based on the second DCI, receive second feedback information associated with the second sidelink information from the second receiving UE, generate HARQ information associated with at least one of the first feedback information or the second feedback information based on the first DCI and the second DCI, and transmit the HARQ information.

Aspects of the present disclosure include the UE above, wherein the first DCI includes a sidelink feedback group indicator indicating a first value, the second DCI includes a sidelink feedback group indicator indicating a first value, and wherein generating the HARQ information comprises generating the HARQ information associated with both the first feedback information and the second feedback information in response to detections of the first DCI and the second DCI each providing a first value of the sidelink feedback group indicator.

Aspects of the present disclosure include any of the UEs above, wherein the first DCI indicates a first counter sidelink assignment index (C-SAI) value of the first sidelink information and the second DCI indicates a second C-SAI value of the second sidelink information, wherein the second C-SAI value sequentially follows the first C-SAI value.

Aspects of the present disclosure include any of the UEs above, wherein the one or more processors are further configured to receive third DCI scheduling a transmission of third sidelink information and including a sidelink feedback group indicator, transmitting the third sidelink information via a third sidelink channel to a third receiving UE, receiving third feedback information associated with the third sidelink information from the third receiving UE, generating second HARQ information associated with the third feedback information and not associated with the first feedback information or the second feedback information based on detection of the third DCI providing a second value of the sidelink feedback group indicator, and transmitting the second HARQ information.

Aspects of the present disclosure include any of the UEs above, wherein the first DCI indicates a first counter sidelink assignment index (C-SAI) value of the first sidelink information, the second DCI indicates a second C-SAI value of the second sidelink information, wherein the second C-SAI value sequentially follows the first C-SAI value, and the third DCI indicates a third C-SAI value of the third sidelink information in response to the sidelink feedback group indicator indicating the second value, wherein the third C-SAI value does not sequentially follow the second C-SAI value.

Aspects of the present disclosure include any of the UEs above, wherein the first DCI and second DCI includes one or more of a group index associated with a scheduled group, a plurality of sidelink feedback group indicators, wherein each of the plurality of sidelink feedback group indicators is associated with a corresponding group of one or more group, a number of requested groups indicating a number of the one or more group to be reported, and a plurality of total sidelink assignment indices (T-SAIs), wherein each of the plurality of T-SAIs is associated with a corresponding group of the one or more group.

Aspects of the present disclosure include any of the UEs above, wherein the number of requested groups in a last DCI of the first DCI and second DCI indicates one group and generating the HARQ information comprises generating the HARQ information associated with both the first feedback information and the second feedback information in response to detections of the first DCI and second DCI each providing a first group index and a first value of the sidelink feedback group indicator associated with the first group index.

Aspects of the present disclosure include any of the UEs above, wherein the first DCI indicates a first counter sidelink assignment index (C-SAI) value of the first sidelink information and the second DCI indicates a second C-SAI value of the second sidelink information, wherein the second C-SAI value sequentially follows the first C-SAI value.

Aspects of the present disclosure include any of the UEs above, wherein the one or more processors are further configured to receive third DCI scheduling a transmission of third sidelink information and including at least one of, a group index, a sidelink feedback group indicator associated with the group index or a number of requested group, transmitting the third sidelink information via a third sidelink channel to a third receiving UE, receiving third feedback information associated with the third sidelink information from the third receiving UE, generating second HARQ information associated with the third feedback information and not associated with the first feedback information or the second feedback information based on the detections of the third DCI providing a first group index value and a second value of sidelink feedback group indicator associated with the first group or the third DCI providing a second group index value, and transmitting the second HARQ information based on detection of the third DCI providing one requested group.

Aspects of the present disclosure include any of the UEs above, wherein the first DCI indicates a first counter sidelink assignment index (C-SAI) value of the first sidelink information, the second DCI indicates a second C-SAI value of the second sidelink information, wherein the second C-SAI value sequentially follows the first C-SAI value, and the third DCI indicates a third C-SAI value of the third sidelink information in response to detections of the third DCI providing a first group index value and a second value of sidelink feedback group indicator associated with the first group or the third DCI providing a second group index value, wherein the third C-SAI value does not sequentially follow the second C-SAI value.

Aspects of the present disclosure include any of the UEs above, wherein the number of requested groups in a last DCI of the first DCI and second DCI indicates two groups, the first feedback information being associated with a first group of the two groups and the second feedback information being associated with a second group of the two groups, a first sidelink feedback group indicator of the plurality of sidelink feedback group indicators in the last DCI of the first DCI and second DCI indicating a first value or a second sidelink feedback group indicator of the plurality of sidelink feedback group indicators in the last DCI of the first DCI and second DCI indicating a second value, the first sidelink feedback group indicator is associated with the first group of the two groups or the second sidelink feedback group indicator is associated with the second group of the two groups, and generating the HARQ information comprises generating the HARQ information associated with the first feedback information and the second feedback information based on detections of the last DCI of the first DCI and second DCI providing two groups to be reported.

Aspects of the present disclosure include any of the UEs above, wherein the HARQ information comprises generating the HARQ information associated with the first feedback information is based at least in part on the first sidelink feedback group indicator indicating the first value and generating the HARQ information associated with the second feedback information is based at least in part on the sidelink feedback group indicator indicating the second value Aspects of the present disclosure include any of the UEs above, wherein the one or more processors are further configured to append the HARQ information associated with the first feedback information to the HARQ information associated with the second feedback information in response to the first group index value being larger than the second group index value or append the HARQ information associated with the second feedback information to the HARQ information associated with the first feedback information in response to the first group index value being smaller than the second group index value.

Aspects of the present disclosure include any of the UEs above, wherein the first sidelink feedback group indicator is associated with a scheduled group, and the second sidelink feedback group indicator is associated with a non-scheduled group.

Alternatively or additionally, the method may further include any of the UEs above, wherein physical uplink control channel (PUCCH) for transmitting the HARQ information overlaps at least a portion of a physical uplink shared channel (PUSCH) and transmitting the HARQ information comprises transmitting the HARQ information via the PUSCH.

Aspects of the present disclosure include any of the UEs above, wherein the one or more processors are further configured to receive DCI scheduling the PUSCH for HARQ-ACK multiplexing and including uplink sidelink assignment index (UL-SAI) field for the two groups, wherein a first portion of bits in the UL-SAI field is allocated for the first group of the two groups and a second portion of the bits in the UL-SAI field is allocated for the second group of the two groups.

Aspects of the present disclosure include any of the UEs above, wherein the one or more processors are further configured to receive DCI scheduling the PUSCH for HARQ-ACK multiplexing and including uplink sidelink assignment index (UL-SAI) field for one group of the two groups and receiving a feedback request for the one group, wherein the UL-SAI field is associated with the one group.

Aspects of the present disclosure include any of the UEs above, wherein the one or more processors are further configured to receive DCI scheduling the PUSCH for HARQ-ACK multiplexing and including an uplink sidelink assignment index (UL-SAI) field for one group of the two groups, receiving a feedback request for the two groups, wherein the UL-SAI field is associated with the first group of the two groups, and deriving a sidelink assignment index for the second group based on a T-SAI of the plurality of T-SAIs.

An aspect of the present disclosure includes a receiving user equipment (UE) including means for receiving first DCI scheduling a transmission of first sidelink information, means for transmitting the first sidelink information via a first sidelink channel to a first receiving UE based on the first DCI, means for receiving first feedback information associated with the first sidelink information from the first receiving UE, receiving second DCI scheduling a transmission of second sidelink information, means for transmitting the second sidelink information via a second sidelink channel to the second receiving UE based on the second DCI, means for receiving second feedback information associated with the second sidelink information from the second receiving UE, means for generating HARQ information associated with at least one of the first feedback information or the second feedback information based on the first DCI and the second DCI, and means for transmitting the HARQ information.

Aspects of the present disclosure include the UE above, wherein the first DCI includes a sidelink feedback group indicator indicating a first value, the second DCI includes a sidelink feedback group indicator indicating a first value, and wherein generating the HARQ information comprises generating the HARQ information associated with both the first feedback information and the second feedback information in response to detections of the first DCI and the second DCI each providing a first value of the sidelink feedback group indicator.

Aspects of the present disclosure include any of the UEs above, wherein the first DCI indicates a first counter sidelink assignment index (C-SAI) value of the first sidelink information and the second DCI indicates a second C-SAI value of the second sidelink information, wherein the second C-SAI value sequentially follows the first C-SAI value.

Aspects of the present disclosure include any of the UEs above, further comprising means for receiving third DCI scheduling a transmission of third sidelink information and including a sidelink feedback group indicator, transmitting the third sidelink information via a third sidelink channel to a third receiving UE, receiving third feedback information associated with the third sidelink information from the third receiving UE, generating second HARQ information associated with the third feedback information and not associated with the first feedback information or the second feedback information based on detection of the third DCI providing a second value of the sidelink feedback group indicator, and transmitting the second HARQ information.

Aspects of the present disclosure include any of the UEs above, wherein the first DCI indicates a first counter sidelink assignment index (C-SAI) value of the first sidelink information, the second DCI indicates a second C-SAI value of the second sidelink information, wherein the second C-SAI value sequentially follows the first C-SAI value, and the third DCI indicates a third C-SAI value of the third sidelink information in response to the sidelink feedback group indicator indicating the second value, wherein the third C-SAI value does not sequentially follow the second C-SAI value.

Aspects of the present disclosure include any of the UEs above, wherein the first DCI and second DCI includes one or more of a group index associated with a scheduled group, a plurality of sidelink feedback group indicators, wherein each of the plurality of sidelink feedback group indicators is associated with a corresponding group of one or more group, a number of requested groups indicating a number of the one or more group to be reported, and a plurality of total sidelink assignment indices (T-SAIs), wherein each of the plurality of T-SAIs is associated with a corresponding group of the one or more group.

Aspects of the present disclosure include any of the UEs above, wherein the number of requested groups in a last DCI of the first DCI and second DCI indicates one group and generating the HARQ information comprises generating the HARQ information associated with both the first feedback information and the second feedback information in response to detections of the first DCI and second DCI each providing a first group index and a first value of the sidelink feedback group indicator associated with the first group index.

Aspects of the present disclosure include any of the UEs above, wherein the first DCI indicates a first counter sidelink assignment index (C-SAI) value of the first sidelink information and the second DCI indicates a second C-SAI value of the second sidelink information, wherein the second C-SAI value sequentially follows the first C-SAI value.

Aspects of the present disclosure include any of the UEs above, further comprising means for receiving third DCI scheduling a transmission of third sidelink information and including at least one of, a group index, a sidelink feedback group indicator associated with the group index or a number of requested group, transmitting the third sidelink information via a third sidelink channel to a third receiving UE, receiving third feedback information associated with the third sidelink information from the third receiving UE, generating second HARQ information associated with the third feedback information and not associated with the first feedback information or the second feedback information based on the detections of the third DCI providing a first group index value and a second value of sidelink feedback group indicator associated with the first group or the third DCI providing a second group index value, and transmitting the second HARQ information based on detection of the third DCI providing one requested group.

Aspects of the present disclosure include any of the UEs above, wherein the first DCI indicates a first counter sidelink assignment index (C-SAI) value of the first sidelink information, the second DCI indicates a second C-SAI value of the second sidelink information, wherein the second C-SAI value sequentially follows the first C-SAI value, and the third DCI indicates a third C-SAI value of the third sidelink information in response to detections of the third DCI providing a first group index value and a second value of sidelink feedback group indicator associated with the first group or the third DCI providing a second group index value, wherein the third C-SAI value does not sequentially follow the second C-SAI value.

Aspects of the present disclosure include any of the UEs above, wherein the number of requested groups in a last DCI of the first DCI and second DCI indicates two groups, the first feedback information being associated with a first group of the two groups and the second feedback information being associated with a second group of the two groups, a first sidelink feedback group indicator of the plurality of sidelink feedback group indicators in the last DCI of the first DCI and second DCI indicating a first value or a second sidelink feedback group indicator of the plurality of sidelink feedback group indicators in the last DCI of the first DCI and second DCI indicating a second value, the first sidelink feedback group indicator is associated with the first group of the two groups or the second sidelink feedback group indicator is associated with the second group of the two groups, and generating the HARQ information comprises generating the HARQ information associated with the first feedback information and the second feedback information based on detections of the last DCI of the first DCI and second DCI providing two groups to be reported.

Aspects of the present disclosure include any of the UEs above, wherein means for generating the HARQ information associated with the first feedback information is based at least in part on the first sidelink feedback group indicator indicating the first value and generating the HARQ information associated with the second feedback information is based at least in part on the sidelink feedback group indicator indicating the second value.

Aspects of the present disclosure include any of the UEs above, further comprising means for appending the HARQ information associated with the first feedback information to the HARQ information associated with the second feedback information in response to the first group index value being larger than the second group index value or means for appending the HARQ information associated with the second feedback information to the HARQ information associated with the first feedback information in response to the first group index value being smaller than the second group index value.

Aspects of the present disclosure include any of the UEs above, wherein the first sidelink feedback group indicator is associated with a scheduled group, and the second sidelink feedback group indicator is associated with a non-scheduled group.

Alternatively or additionally, the method may further include any of the UEs above, wherein physical uplink control channel (PUCCH) for transmitting the HARQ information overlaps at least a portion of a physical uplink shared channel (PUSCH) and transmitting the HARQ information comprises transmitting the HARQ information via the PUSCH.

Aspects of the present disclosure include any of the UEs above, further comprising means for receiving DCI scheduling the PUSCH for HARQ-ACK multiplexing and including uplink sidelink assignment index (UL-SAI) field for the two groups, wherein a first portion of bits in the UL-SAI field is allocated for the first group of the two groups and a second portion of the bits in the UL-SAI field is allocated for the second group of the two groups.

Aspects of the present disclosure include any of the UEs above, further comprising means for receiving DCI scheduling the PUSCH for HARQ-ACK multiplexing and including uplink sidelink assignment index (UL-SAI) field for one group of the two groups and receiving a feedback request for the one group, wherein the UL-SAI field is associated with the one group.

Aspects of the present disclosure include any of the UEs above, further comprising means for receiving DCI scheduling the PUSCH for HARQ-ACK multiplexing and including an uplink sidelink assignment index (UL-SAI) field for one group of the two groups, receiving a feedback request for the two groups, wherein the UL-SAI field is associated with the first group of the two groups, and deriving a sidelink assignment index for the second group based on a T-SAI of the plurality of T-SAIs.

Some aspects of the present disclosure include a non-transitory computer readable medium having instructions stored therein that, when executed by one or more processors of a receiving user equipment (UE), cause the one or more processors to receive first DCI scheduling a transmission of first sidelink information, transmit the first sidelink information via a first sidelink channel to a first receiving UE based on the first DCI, receive first feedback information associated with the first sidelink information from the first receiving UE, receive second DCI scheduling a transmission of second sidelink information, transmit the second sidelink information via a second sidelink channel to the second receiving UE based on the second DCI, receive second feedback information associated with the second sidelink information from the second receiving UE, generate HARQ information associated with at least one of the first feedback information or the second feedback information based on the first DCI and the second DCI, and transmit the HARQ information.

Aspects of the present disclosure include the non-transitory computer readable medium above, wherein the first DCI includes a sidelink feedback group indicator indicating a first value, the second DCI includes a sidelink feedback group indicator indicating a first value, and wherein generating the HARQ information comprises generating the HARQ information associated with both the first feedback information and the second feedback information in response to detections of the first DCI and the second DCI each providing a first value of the sidelink feedback group indicator.

Aspects of the present disclosure include any of the non-transitory computer readable media above, wherein the first DCI indicates a first counter sidelink assignment index (C-SAI) value of the first sidelink information and the second DCI indicates a second C-SAI value of the second sidelink information, wherein the second C-SAI value sequentially follows the first C-SAI value.

Aspects of the present disclosure include any of the non-transitory computer readable media above, wherein the one or more processors are further configured to receive third DCI scheduling a transmission of third sidelink information and including a sidelink feedback group indicator, transmitting the third sidelink information via a third sidelink channel to a third receiving UE, receiving third feedback information associated with the third sidelink information from the third receiving UE, generating second HARQ information associated with the third feedback information and not associated with the first feedback information or the second feedback information based on detection of the third DCI providing a second value of the sidelink feedback group indicator, and transmitting the second HARQ information.

Aspects of the present disclosure include any of the non-transitory computer readable media above, wherein the first DCI indicates a first counter sidelink assignment index (C-SAI) value of the first sidelink information, the second DCI indicates a second C-SAI value of the second sidelink information, wherein the second C-SAI value sequentially follows the first C-SAI value, and the third DCI indicates a third C-SAI value of the third sidelink information in response to the sidelink feedback group indicator indicating the second value, wherein the third C-SAI value does not sequentially follow the second C-SAI value.

Aspects of the present disclosure include any of the non-transitory computer readable media above, wherein the first DCI and second DCI includes one or more of a group index associated with a scheduled group, a plurality of sidelink feedback group indicators, wherein each of the plurality of sidelink feedback group indicators is associated with a corresponding group of one or more group, a number of requested groups indicating a number of the one or more group to be reported, and a plurality of total sidelink assignment indices (T-SAIs), wherein each of the plurality of T-SAIs is associated with a corresponding group of the one or more group.

Aspects of the present disclosure include any of the non-transitory computer readable media above, wherein the number of requested groups in a last DCI of the first DCI and second DCI indicates one group and generating the HARQ information comprises generating the HARQ information associated with both the first feedback information and the second feedback information in response to detections of the first DCI and second DCI each providing a first group index and a first value of the sidelink feedback group indicator associated with the first group index.

Aspects of the present disclosure include any of the non-transitory computer readable media above, wherein the first DCI indicates a first counter sidelink assignment index (C-SAI) value of the first sidelink information and the second DCI indicates a second C-SAI value of the second sidelink information, wherein the second C-SAI value sequentially follows the first C-SAI value.

Aspects of the present disclosure include any of the non-transitory computer readable media above, further comprises instructions that cause the one or more processors to receive third DCI scheduling a transmission of third sidelink information and including at least one of, a group index, a sidelink feedback group indicator associated with the group index or a number of requested group, transmitting the third sidelink information via a third sidelink channel to a third receiving UE, receiving third feedback information associated with the third sidelink information from the third receiving UE, generating second HARQ information associated with the third feedback information and not associated with the first feedback information or the second feedback information based on the detections of the third DCI providing a first group index value and a second value of sidelink feedback group indicator associated with the first group or the third DCI providing a second group index value, and transmitting the second HARQ information based on detection of the third DCI providing one requested group.

Aspects of the present disclosure include any of the non-transitory computer readable media above, wherein the first DCI indicates a first counter sidelink assignment index (C-SAI) value of the first sidelink information, the second DCI indicates a second C-SAI value of the second sidelink information, wherein the second C-SAI value sequentially follows the first C-SAI value, and the third DCI indicates a third C-SAI value of the third sidelink information in response to detections of the third DCI providing a first group index value and a second value of sidelink feedback group indicator associated with the first group or the third DCI providing a second group index value, wherein the third C-SAI value does not sequentially follow the second C-SAI value.

Aspects of the present disclosure include any of the non-transitory computer readable media above, wherein the number of requested groups in a last DCI of the first DCI and second DCI indicates two groups, the first feedback information being associated with a first group of the two groups and the second feedback information being associated with a second group of the two groups, a first sidelink feedback group indicator of the plurality of sidelink feedback group indicators in the last DCI of the first DCI and second DCI indicating a first value or a second sidelink feedback group indicator of the plurality of sidelink feedback group indicators in the last DCI of the first DCI and second DCI indicating a second value, the first sidelink feedback group indicator is associated with the first group of the two groups or the second sidelink feedback group indicator is associated with the second group of the two groups, and generating the HARQ information comprises generating the HARQ information associated with the first feedback information and the second feedback information based on detections of the last DCI of the first DCI and second DCI providing two groups to be reported.

Aspects of the present disclosure include any of the non-transitory computer readable media above, wherein the instructions for generating the HARQ information comprises instructions for generating the HARQ information associated with the first feedback information is based at least in part on the first sidelink feedback group indicator indicating the first value and generating the HARQ information associated with the second feedback information is based at least in part on the sidelink feedback group indicator indicating the second value.

Aspects of the present disclosure include any of the non-transitory computer readable media above, further comprising instructions for appending the HARQ information associated with the first feedback information to the HARQ information associated with the second feedback information in response to the first group index value being larger than the second group index value or instructions for appending the HARQ information associated with the second feedback information to the HARQ information associated with the first feedback information in response to the first group index value being smaller than the second group index value.

Aspects of the present disclosure include any of the non-transitory computer readable media above, wherein the first sidelink feedback group indicator is associated with a scheduled group, and the second sidelink feedback group indicator is associated with a non-scheduled group.

Alternatively or additionally, the method may further include any of the non-transitory computer readable media above, wherein physical uplink control channel (PUCCH) for transmitting the HARQ information overlaps at least a portion of a physical uplink shared channel (PUSCH) and transmitting the HARQ information comprises transmitting the HARQ information via the PUSCH.

Aspects of the present disclosure include any of the non-transitory computer readable media above, further comprises instructions that cause the one or more processors to receive DCI scheduling the PUSCH for HARQ-ACK multiplexing and including uplink sidelink assignment index (UL-SAI) field for the two groups, wherein a first portion of bits in the UL-SAI field is allocated for the first group of the two groups and a second portion of the bits in the UL-SAI field is allocated for the second group of the two groups.

Aspects of the present disclosure include any of the non-transitory computer readable media above, further comprises instructions that cause the one or more processors to receive DCI scheduling the PUSCH for HARQ-ACK multiplexing and including uplink sidelink assignment index (UL-SAI) field for one group of the two groups and receiving a feedback request for the one group, wherein the UL-SAI field is associated with the one group.

Aspects of the present disclosure include any of the non-transitory computer readable media above, further comprises instructions that cause the one or more processors to receive DCI scheduling the PUSCH for HARQ-ACK multiplexing and including an uplink sidelink assignment index (UL-SAI) field for one group of the two groups, receiving a feedback request for the two groups, wherein the UL-SAI field is associated with the first group of the two groups, and deriving a sidelink assignment index for the second group based on a T-SAI of the plurality of T-SAIs.

The above detailed description set forth above in connection with the appended drawings describes examples and does not represent the only examples that may be implemented or that are within the scope of the claims. The term “example,” when used in this description, means “serving as an example, instance, or illustration,” and not “preferred” or “advantageous over other examples.” The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms “system” and “network” are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named “3rd Generation Partnership Project” (3GPP). CDMA2000 and UMB are described in documents from an organization named “3rd Generation Partnership Project 2” (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a receiving user equipment (UE) in a network, comprising:

receiving first downlink control information (DCI) scheduling a first transmission of first sidelink information;

transmitting the first sidelink information via a first sidelink channel to a first receiving UE based on the first DCI;

receiving first feedback information associated with the first sidelink information from the first receiving UE;

receiving second DCI scheduling a second transmission of second sidelink information;

transmitting the second sidelink information via a second sidelink channel to a second receiving UE based on the second DCI;

receiving second feedback information associated with the second sidelink information from the second receiving UE;

generating hybrid automatic repeat request (HARQ) information associated with at least one of the first feedback information or the second feedback information based on the first DCI and the second DCI; and transmitting the HARQ information.

2. The method of claim 1, wherein:

the first DCI includes a first sidelink feedback group indicator indicating a first value;

the second DCI includes a second sidelink feedback group indicator indicating the first value;

wherein generating the HARQ information comprises generating the HARQ information associated with both the first feedback information and the second feedback information in response to detections of the first DCI and the second DCI each providing the first value of the first sidelink feedback group indicator and the second sidelink feedback group indicator.

3. The method of claim 2, wherein:

the first DCI indicates a first counter sidelink assignment index (C-SAI) value of the first sidelink information; and the second DCI indicates a second C-SAI value of the second sidelink information, wherein the second C-SAI value sequentially follows the first C-SAI value.

4. The method of claim 1, further comprising:

receiving third DCI scheduling a third transmission of third sidelink information and including a third sidelink feedback group indicator;

transmitting the third sidelink information via a third sidelink channel to a third receiving UE;

receiving third feedback information associated with the third sidelink information from the third receiving UE;

generating second HARQ information associated with the third feedback information and not associated with the first feedback information or the second feedback information based on detection of the third DCI providing a second value of the third sidelink feedback group indicator; and transmitting the second HARQ information.

5. The method of claim 4, wherein:

the first DCI indicates a first counter sidelink assignment index (C-SAI) value of the first sidelink information;

the second DCI indicates a second C-SAI value of the second sidelink information, wherein the second C-SAI value sequentially follows the first C-SAI value; and the third DCI indicates a third C-SAI value of the third sidelink information in response to the third sidelink feedback group indicator indicating the second value, wherein the third C-SAI value does not sequentially follow the second C-SAI value.

6. The method of claim 1, wherein:

the first DCI and the second DCI each includes one or more of:

a group index associated with a scheduled group;

a plurality of sidelink feedback group indicators, wherein each of the plurality of sidelink feedback group indicators is associated with a corresponding group of one or more group;

a number of requested groups indicating a number of the one or more group to be reported; or a plurality of total sidelink assignment indices (T-SAIs), wherein each of the plurality of T-SAIs is associated with a corresponding group of the one or more group.

7. The method of claim 6, wherein:

the number of requested groups in a last DCI of the first DCI and the second DCI indicates one group; and generating the HARQ information comprises generating the HARQ information associated with both the first feedback information and the second feedback information in response to detections of the first DCI and the second DCI each providing a first group index and a first value of the sidelink feedback group indicator associated with the first group index.

8. The method of claim 7, wherein:

the first DCI indicates a first counter sidelink assignment index (C-SAI) value of the first sidelink information; and the second DCI indicates a second C-SAI value of the second sidelink information, wherein the second C-SAI value sequentially follows the first C-SAI value.

9. The method of claim 6, further comprising:

receiving third DCI scheduling a transmission of third sidelink information and including at least one of, the group index, a sidelink feedback group indicator associated with the group index or the number of requested groups;

transmitting the third sidelink information via a third sidelink channel to a third receiving UE;

receiving third feedback information associated with the third sidelink information from the third receiving UE; and generating second HARQ information associated with the third feedback information and not associated with the first feedback information or the second feedback information based on detections of the third DCI providing a first group index value and a second value of the sidelink feedback group indicator associated with the first group or the third DCI providing a second group index value; and transmitting the second HARQ information based on detection of the third DCI providing one requested group.

10. The method of claim 9, wherein:

the first DCI indicates a first counter sidelink assignment index (C-SAI) value of the first sidelink information;

the second DCI indicates a second C-SAI value of the second sidelink information, wherein the second C-SAI value sequentially follows the first C-SAI value; and the third DCI indicates a third C-SAI value of the third sidelink information in response to detections of the third DCI providing the first group index value and the second value of the sidelink feedback group indicator associated with the first group or the third DCI providing the second group index value, wherein the third C-SAI value does not sequentially follow the second C-SAI value.

11. The method of claim 6, wherein:

the number of requested groups in a last DCI of the first DCI and the second DCI indicates two groups, the first feedback information being associated with a first group of the two groups and the second feedback information being associated with a second group of the two groups;

a first sidelink feedback group indicator of the plurality of sidelink feedback group indicators in the last DCI of the first DCI and the second DCI indicating a first value or a second sidelink feedback group indicator of the plurality of sidelink feedback group indicators in the last DCI of the first DCI and the second DCI indicating a second value;

the first sidelink feedback group indicator is associated with the first group of the two groups or the second sidelink feedback group indicator is associated with the second group of the two groups; and generating the HARQ information comprises generating the HARQ information associated with the first feedback information and the second feedback information based on detections of the last DCI of the first DCI and the second DCI providing the two groups to be reported.

12. The method of claim 11, wherein generating the HARQ information comprises generating the HARQ information associated with the first feedback information is based at least in part on the first sidelink feedback group indicator indicating the first value and generating the HARQ information associated with the second feedback information is based at least in part on the second sidelink feedback group indicator indicating the second value.

13. The method of claim 11, further comprising:

appending the HARQ information associated with the first feedback information to the HARQ information associated with the second feedback information in response to a first group index value being larger than a second group index value; or appending the HARQ information associated with the second feedback information to the HARQ information associated with the first feedback information in response to the first group index value being smaller than the second group index value.

14. The method of claim 11, wherein:
the first sidelink feedback group indicator is associated with the scheduled group; and
the second sidelink feedback group indicator is associated with a non-scheduled group.
15. The method of claim 1, wherein:
physical uplink control channel (PUCCH) for transmitting the HARQ information overlaps at least a portion of a physical uplink shared channel (PUSCH); and
transmitting the HARQ information comprises transmitting the HARQ information via the PUSCH.
16. The method of claim 15, further comprising:
receiving a respective DCI scheduling the PUSCH for HARQ-ACK multiplexing and including uplink sidelink assignment index (UL-SAI) field for two groups, wherein a first portion of bits in the UL-SAI field is allocated for a first group of the two groups and a second portion of the bits in the UL-SAI field is allocated for a second group of the two groups.
17. The method of claim 15, further comprising:
receiving a respective DCI scheduling the PUSCH for HARQ-ACK multiplexing and including uplink sidelink assignment index (UL-SAI) field for one group out of two groups; and
receiving a feedback request for the one group, wherein the UL-SAI field is associated with the one group.
18. The method of claim 15, further comprising:
receiving a respective DCI scheduling the PUSCH for HARQ-ACK multiplexing and including an uplink sidelink assignment index (UL-SAI) field for one group out of two groups;
receiving a feedback request for the two groups, wherein the UL-SAI field is associated with a first group of the two groups; and
deriving a sidelink assignment index for a second group of the two groups based on a T-SAI of a plurality of T-SAIs.
19. A receiving user equipment (UE), comprising:
a memory comprising instructions;
a transceiver; and
one or more processors operatively coupled with the memory and the transceiver, the one or more processors configured to execute the instructions in the memory to:
receive first downlink control information (DCI) scheduling a first transmission of first sidelink information;
transmit the first sidelink information via a first sidelink channel to a first receiving UE based on the first DCI;
receive first feedback information associated with the first sidelink information from the first receiving UE;
receive second DCI scheduling a second transmission of second sidelink information;
transmit the second sidelink information via a second sidelink channel to a second receiving UE based on the second DCI;
receive second feedback information associated with the second sidelink information from the second receiving UE;
generate hybrid automatic repeat request (HARQ) information associated with at least one of the first feedback information or the second feedback information based on the first DCI and the second DCI; and
transmit the HARQ information.
20. The UE of claim 19, wherein:
the first DCI includes a first sidelink feedback group indicator indicating a first value;
the second DCI includes a second sidelink feedback group indicator indicating the first value;
wherein generating the HARQ information comprises generating the HARQ information associated with both the first feedback information and the second feedback information in response to detections of the first DCI and the second DCI each providing the first value of the first sidelink feedback group indicator and the second sidelink feedback group indicator.
21. The UE of claim 20 wherein:
the first DCI indicates a first counter sidelink assignment index (C-SAI) value of the first sidelink information; and
the second DCI indicates a second C-SAI value of the second sidelink information, wherein the second C-SAI value sequentially follows the first C-SAI value.
22. The UE of claim 19, wherein the one or more processors are further configured to:
receive third DCI scheduling a third transmission of third sidelink information and including a third sidelink feedback group indicator;
transmit the third sidelink information via a third sidelink channel to a third receiving UE;
receive third feedback information associated with the third sidelink information from the third receiving UE;
generate second HARQ information associated with the third feedback information and not associated with the first feedback information or the second feedback information based on detection of the third DCI providing a second value of the third sidelink feedback group indicator; and
transmit the second HARQ information.
23. The UE of claim 22, wherein:
the first DCI indicates a first counter sidelink assignment index (C-SAI) value of the first sidelink information;
the second DCI indicates a second C-SAI value of the second sidelink information, wherein the second C-SAI value sequentially follows the first C-SAI value; and
the third DCI indicates a third C-SAI value of the third sidelink information in response to the third sidelink feedback group indicator indicating the second value, wherein the third C-SAI value does not sequentially follow the second C-SAI value.
24. The UE of claim 19, wherein:
the first DCI and the second DCI each includes one or more of:
a group index associated with a scheduled group;
a plurality of sidelink feedback group indicators, wherein each of the plurality of sidelink feedback group indicators is associated with a corresponding group of one or more group;
a number of requested groups indicating a number of the one or more group to be reported; or
a plurality of total sidelink assignment indices (T-SAIs), wherein each of the plurality of T-SAIs is associated with a corresponding group of the one or more group.
25. The UE of claim 24, wherein:
the number of requested groups in a last DCI of the first DCI and the second DCI indicates one group; and
generating the HARQ information comprises generating the HARQ information associated with both the first feedback information and the second feedback information in response to detections of the first DCI and the second DCI each providing a first group index and a first value of the sidelink feedback group indicator associated with the first group index.

26. The UE of claim 25, wherein:

the first DCI indicates a first counter sidelink assignment index (C-SAI) value of the first sidelink information; and the second DCI indicates a second C-SAI value of the second sidelink information, wherein the second C-SAI value sequentially follows the first C-SAI value.

27. The UE of claim 25, wherein the one or more processors are further configured to:

receive third DCI scheduling a transmission of third sidelink information and including at least one of, the group index, a sidelink feedback group indicator associated with the group index or the number of requested groups;

transmit the third sidelink information via a third sidelink channel to a third receiving UE;

receive third feedback information associated with the third sidelink information from the third receiving UE; and generate second HARQ information associated with the third feedback information and not associated with the first feedback information or the second feedback information based on detections of the third DCI providing a first group index value and a second value of the sidelink feedback group indicator associated with the first group or the third DCI providing a second group index value; and transmit the second HARQ information based on detection of the third DCI providing one requested group.

28. The UE of claim 27, wherein:

the first DCI indicates a first counter sidelink assignment index (C-SAI) value of the first sidelink information;

the second DCI indicates a second C-SAI value of the second sidelink information, wherein the second C-SAI value sequentially follows the first C-SAI value; and the third DCI indicates a third C-SAI value of the third sidelink information in response to detections of the third DCI providing the first group index value and the second value of the sidelink feedback group indicator associated with the first group or the third DCI providing the second group index value, wherein the third C-SAI value does not sequentially follow the second C-SAI value.

29. A non-transitory computer readable medium having instructions stored therein that, when executed by one or more processors of a user equipment (UE), cause the one or more processors to:

receive first downlink control information (DCI) scheduling a first transmission of first sidelink information;

transmit the first sidelink information via a first sidelink channel to a first receiving UE based on the first DCI;

receive first feedback information associated with the first sidelink information from the first receiving UE;

receive second DCI scheduling a second transmission of second sidelink information;

transmit the second sidelink information via a second sidelink channel to a second receiving UE based on the second DCI;

receive second feedback information associated with the second sidelink information from the second receiving UE;

generate hybrid automatic repeat request (HARQ) information associated with at least one of the first feedback information or the second feedback information based on the first DCI and the second DCI; and transmit the HARQ information.

30. A user equipment (UE), comprising:

means for receiving first downlink control information (DCI) scheduling a first transmission of first sidelink information;

means for transmitting the first sidelink information via a first sidelink channel to a first receiving UE based on the first DCI;

means for receiving first feedback information associated with the first sidelink information from the first receiving UE;

means for receiving second DCI scheduling a second transmission of second sidelink information;

means for transmitting the second sidelink information via a second sidelink channel to a second receiving UE based on the second DCI;

means for receiving second feedback information associated with the second sidelink information from the second receiving UE;

means for generating hybrid automatic repeat request (HARQ) information associated with at least one of the first feedback information or the second feedback information based on the first DCI and the second DCI; and means for transmitting the HARQ information.

* * * * *